(12) United States Patent
Hotta et al.

(10) Patent No.: US 6,715,006 B1
(45) Date of Patent: Mar. 30, 2004

(54) DISK TIME-SHARING APPARATUS AND METHOD

(75) Inventors: Yuuji Hotta, Kawasaki (JP); Riichiro Take, Kawasaki (JP); Tadaomi Kato, Kawasaki (JP); Mikio Ito, Kawasaki (JP); Hidejiro Daikokuya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/562,965

(22) Filed: May 3, 2000

(30) Foreign Application Priority Data

Jul. 29, 1999 (JP) .......................................... 11-215492

(51) Int. Cl.⁷ .......................... G06F 12/02; G06F 13/10
(52) U.S. Cl. ................. 710/45; 710/40; 711/4
(58) Field of Search ....................... 710/40, 45; 711/4, 711/112; 709/102, 104, 213; 707/9; 365/230.01; 714/48

(56) References Cited

U.S. PATENT DOCUMENTS 3,593,314 A * 7/1971 Moll
5,491,694 A * 2/1996 Oliver et al.
5,938,734 A * 8/1999 Yao et al.
6,269,403 B1 * 7/2001 Anders

OTHER PUBLICATIONS

"Storage allocation policies for the time–dependent multimedia data" by Chen et al.. (abstract only).*

* cited by examiner

Primary Examiner—Gopal C. Ray
(74) Attorney, Agent, or Firm—Staas & Halsey LLP

(57) ABSTRACT

An input/output scheduling unit forms input/output groups obtained by grouping inputs/outputs to/from a disk apparatus. The input/output scheduling unit defines a ratio of the time during which each input/output group uses the disk apparatus and defines quanta $\tau1$ to $\tau3$ during which each input/output group can continuously use the disk apparatus on the basis of the defined time ratios. When input/output requests are received from a plurality of input/output groups to the disk apparatus, the input/output scheduling unit performs the time-sharing for sequentially switching the allocating times $\tau1$ to $\tau3$ between the input/output groups which competed and using the disk apparatus. Further, an allocating time of the remaining quanta is distributed to the quanta on the shortage side by an allocating time control unit in accordance with a degree of jam of each input/output group.

38 Claims, 22 Drawing Sheets

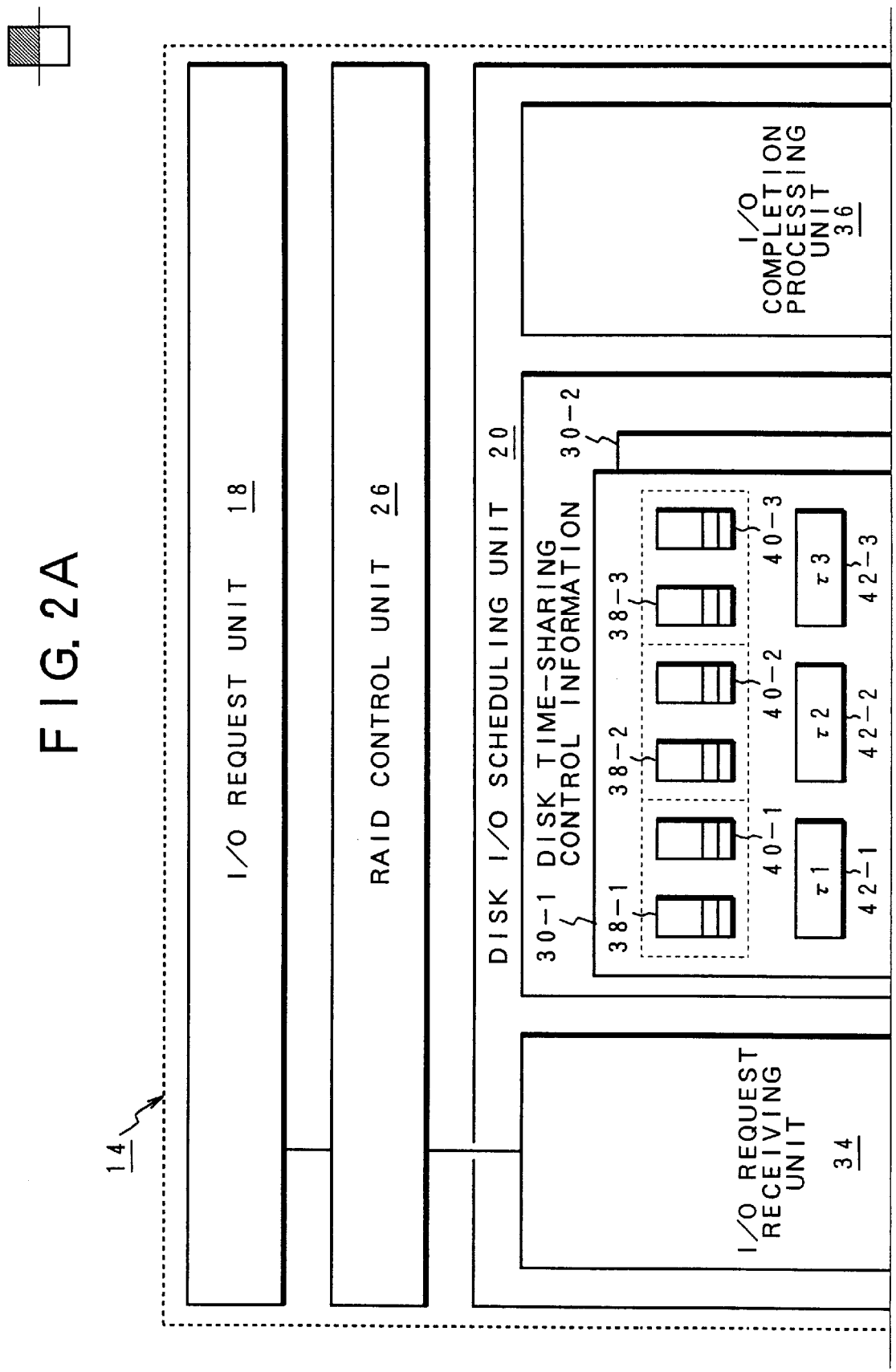

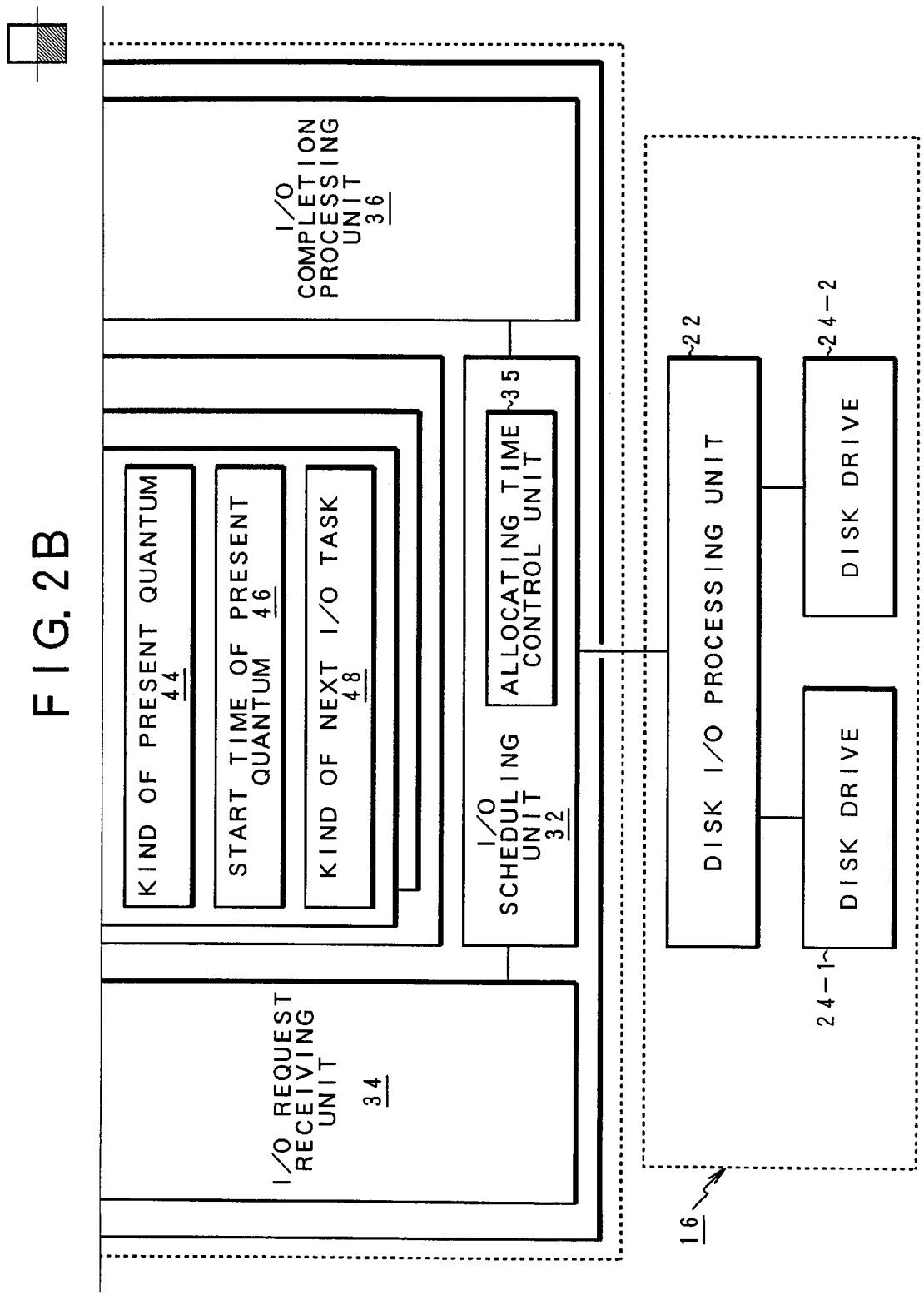

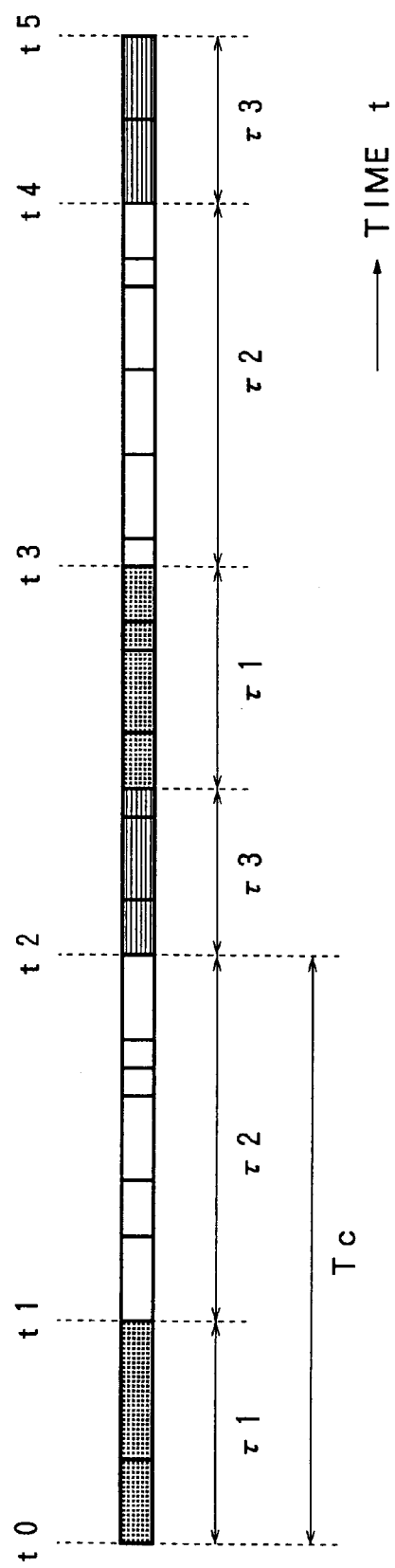

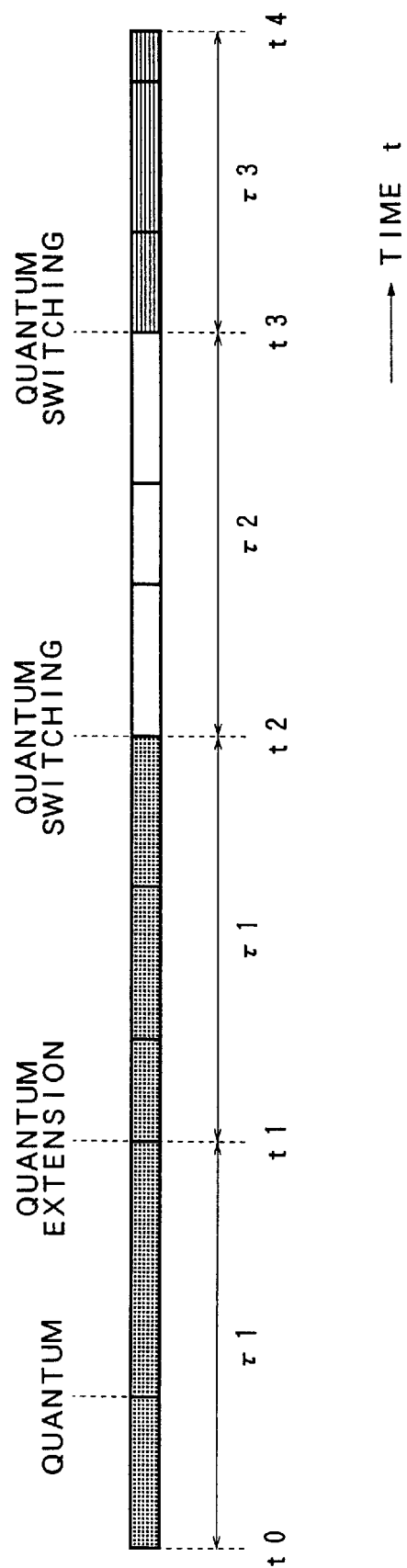

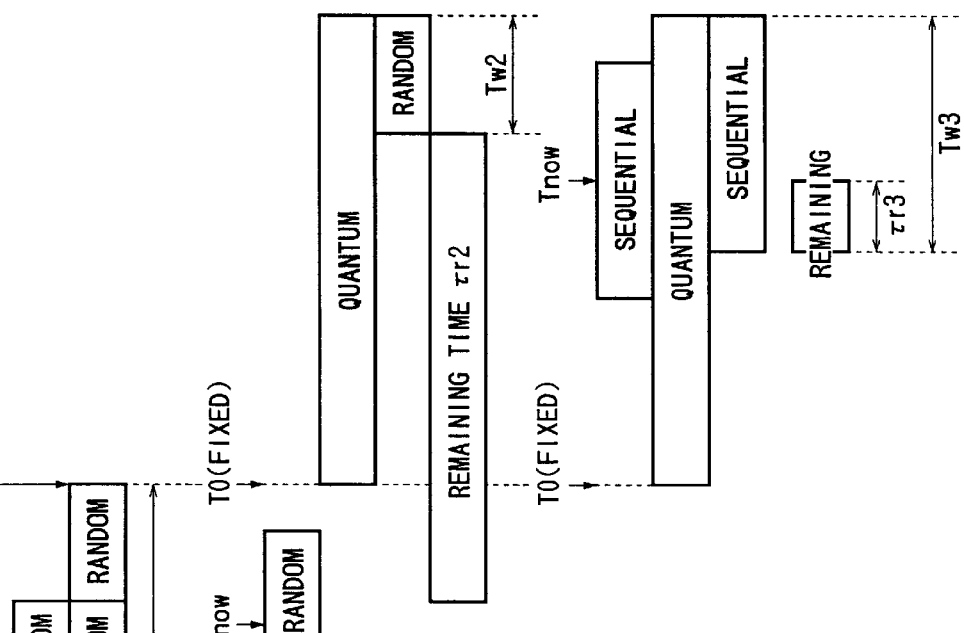
FIG. 5A UNDER REQUEST
FIG. 5B I/O UNPROCESSING TIME
FIG. 5C UNDER REQUEST
FIG. 5D QUANTUM ALLOCATING TIME
FIG. 5E I/O UNPROCESSING TIME
FIG. 5F REMAINING TIME
FIG. 5G UNDER REQUEST
FIG. 5H QUANTUM ALLOCATING TIME
FIG. 5I I/O UNPROCESSING TIME
FIG. 5J REMAINING TIME (SHORTAGE)

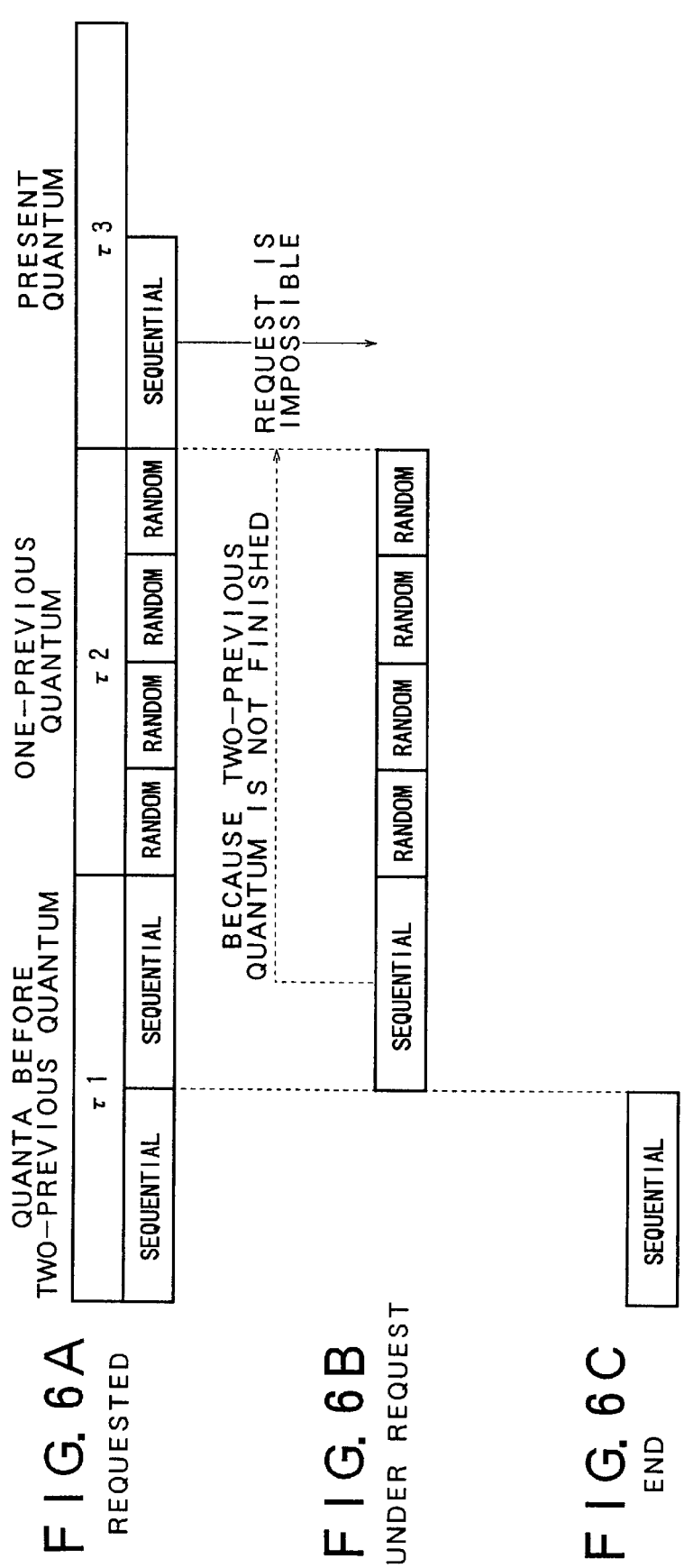

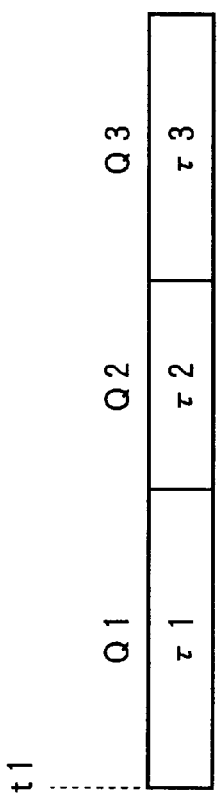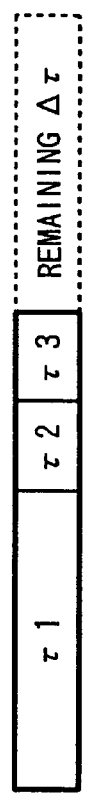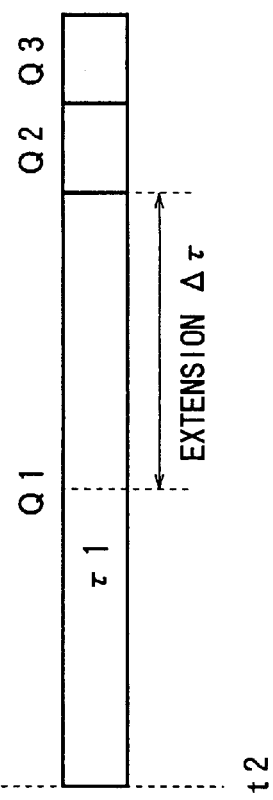
FIG. 9A INITIAL SET
FIG. 9B RESULT
FIG. 9C NEXT SET

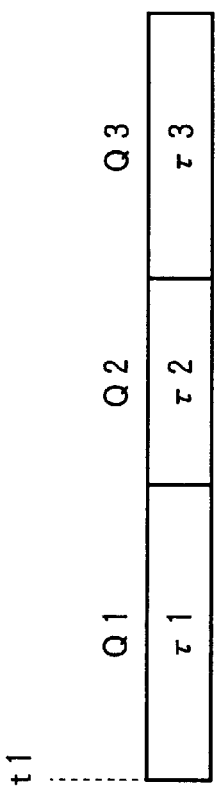
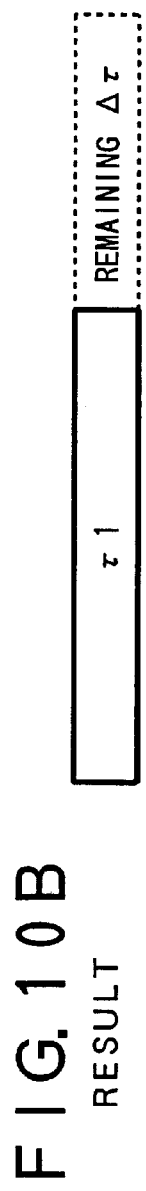
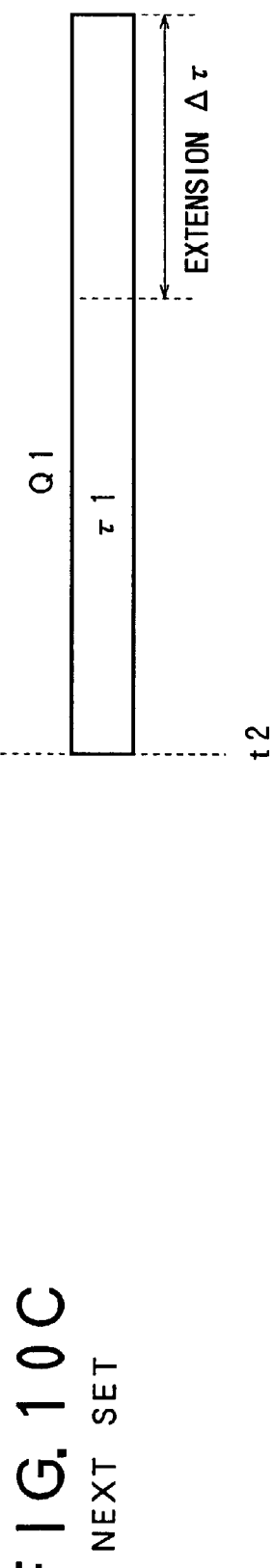
FIG. 10A INITIAL SET
FIG. 10B RESULT
FIG. 10C NEXT SET

FIG. 11A QUANTUM

| | T1 | T2 | T3 |
|---|---|---|---|
| | Q1 Q2 Q3 | | |

FIG. 11B INITIAL ALLOCATION

| | T1 | T2 | T3 |
|---|---|---|---|
| | 30 20 20 | | |

FIG. 11C REALLOCATION

| | T1 | T2 | T3 |
|---|---|---|---|
| | 30 20 20 | 30 20 20 | 30 20 20 |

FIG. 11D RESULT

| | T1 | T2 | T3 |
|---|---|---|---|
| | 30 0 0 | 20 | 20 |

FIG. 11E ACCOMPLISHMENT FLAG

| | T1 | T2 | T3 |
|---|---|---|---|
| | 1/1 1 1 | 1 1/1 1 | 1 1 1/1 |

FIG. 11F DISTRIBUTION AMOUNT

| | T1 | T2 | T3 |
|---|---|---|---|
| | 0 0 0 | 0 0 0 | 0 0 0 |

| | T1 | T2 | T3 | T4 | T5 | T6 | T7 |
|---|---|---|---|---|---|---|---|
| FIG. 12A QUANTUM | Q1 Q2 Q3 | | | | | | |
| FIG. 12B INITIAL ALLOCATION | 30 20 20 | | | | | | |
| FIG. 12C REALLOCATION | 30 20 20 | 30 30 30 | 30 30 20 | 30 40 20 | 30 60 20 | 30 20 20 | 30 30 20 |
| FIG. 12D RESULT | 10 | 30 | 10 10 | 10 10 | 60 | 10 10 | |
| FIG. 12E ACCOMPLISHMENT FLAG | 1/0 1 1 | 0 1/1 1 | 1/0 1 0 | 1/0 1 0 | 0 1/1 0 | 1 0 1 | 0/0 1 0/0 |
| FIG. 12F DISTRIBUTION AMOUNT | 0 10 10 | 0 0 0 | 0 20 0 | 0 20 0 | 0 0 0 | 0 10 0 | 0 20 0 |

|  | T1 | T2 | T3 | T4 | T5 |
|---|---|---|---|---|---|
| FIG. 13A QUANTUM | Q1 Q2 Q3 | | | | |
| FIG. 13B INITIAL ALLOCATION | 30 20 20 | | | | |
| FIG. 13C REALLOCATION | 30 20 20 | 30 25 25 | 30 20 | 30 20 20 | 30 20 20 |
| | | | 30 | 40 | 30 |
| FIG. 13D RESULT | 20 | 10 | 0 | 10 20 | 10 |
| FIG. 13E ACCOMPLISHMENT FLAG | 1/0 | 1 0 1/0 | 1 0 | 0 1/0 0 | 0 0/0 0 |
| FIG. 13F DISTRIBUTION AMOUNT | 0 5 5 | 0 0 15 | 0 0 0 | 0 0 0 | 0 0 0 |

FIG. 13A QUANTUM
FIG. 13B INITIAL ALLOCATION
FIG. 13C REALLOCATION
FIG. 13D RESULT
FIG. 13E ACCOMPLISHMENT FLAG
FIG. 13F DISTRIBUTION AMOUNT

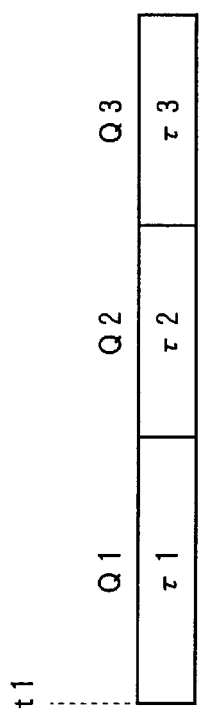
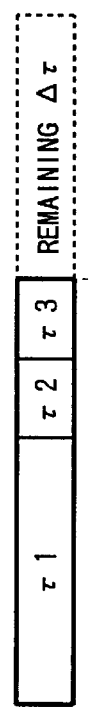
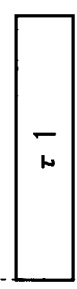
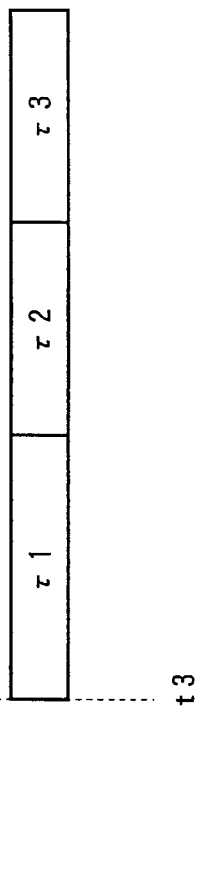
FIG.14A INITIAL SET
FIG.14B RESULT
FIG.14C RESET
FIG.14D RESULT
FIG.14E NEXT SET (INITIAL VALUE)

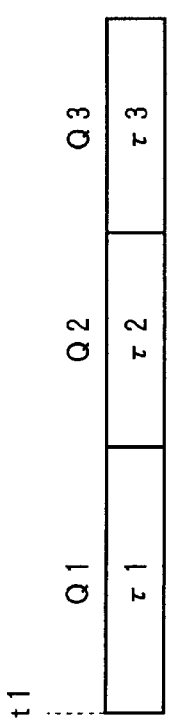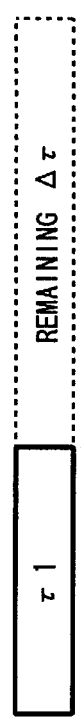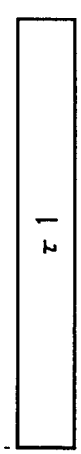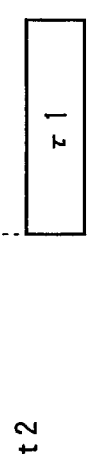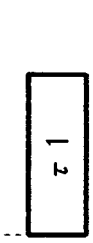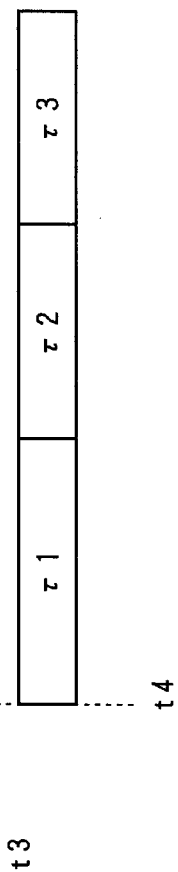
FIG. 15A INITIAL SET
FIG. 15B RESULT
FIG. 15C RESET
FIG. 15D RESULT
FIG. 15E RESET
FIG. 15F RESULT
FIG. 15G NEXT SET

DISK TIME-SHARING APPARATUS AND METHOD

BACKGROUND OF THE INVENTION

1. Field of the Invention

The present invention relates to disk time-sharing apparatus and method for scheduling the use of a disk apparatus on the basis of a plurality of inputs and outputs and, more particularly, to disk time-sharing apparatus and method for scheduling the use of a disk apparatus so as to sequentially switch allocating times for inputs and outputs which compete.

2. Description of the Related Arts

Hitherto, in a storage system for managing data by using a disk apparatus such as a hard disk drive or the like, for example, the disk apparatus is constructed as an apparatus of an RAID structure, the RAID apparatus is connected under domination of a disk control apparatus, and an input/output to/from an upper host is processed, or the RAID apparatus is directly connected to a server and an input/output to/from a server OS is processed. In such a storage system, when a random access in which a guarantee of a response time is requested and a sequential access in which importance is attached to a processing amount per unit time need to be performed to the same disk apparatus, the operation is performed in a time-sharing manner so that the random access and the sequential access do not compete. For instance, in the daytime, an OLTP (On Line Transaction Processing) operation in which the random access is mainly performed is executed to a database of the disk apparatus and, in the nighttime after completion of the OLTP operation, the database is backed up.

(Resource Distribution of Random Access and Sequential Access)

In the storage system, however, in association with the realization of non-stop (fault tolerant) of the operation, the OLTP operation of the random access system needs to be continued even in the nighttime, so that the backup as a sequential access needs to be executed during the OLTP operation of the random access system. In case of only the random access, IOPS (Inputs/Outputs Per Second), for example, 100 IOPS, as the number of inputting/outputting times per unit time which can satisfy a certain average response time, for example, 30 msec can be estimated. In case of only the sequential access, a throughput, for example, 20 MB/sec can be estimated. When the random access and the sequential access are simultaneously performed, however, received input/output requests are processed by a queue using an FIFO. Therefore, there is no mechanism to guarantee a period of time during which the random access can use the disk apparatus and a period of time during which the sequential access can use the disk apparatus. For example, even in the case where the random access of 50 IOPS at an average response time of 30 msec and the sequential access of 5 MB/sec are required, if the sequential access is frequently generated, the throughput of the sequential access rises from 5 MB/sec to 10 MB/sec although it is unnecessary to rise. On the contrary, the IOPS to satisfy the average response time of 30 msec in the random access deteriorates from 50 IOPS to 25 IOPS although the user does not want to reduce it.

(Resource Distribution Between Logic Volumes)

In the conventional storage system, by arranging data having different performance requirements to the different disk apparatuses, respective performance characteristics are derived. For example, data in which a guarantee of a response time is requested in the random access of a small amount of data and data in which importance is attached to a processing amount per unit time in the sequential access of a large amount of data are arranged in the different disk apparatuses. However, in association with the realization of a large capacity of the disk apparatus, the number of cases of arranging data of different performance requirements to the same disk apparatus is increasing. Even when logic volumes of the different performance requirements are arranged to the same disk as mentioned above, a similar problem occurs. Hitherto, there is no mechanism in which the received inputs/outputs are scheduled by the FIFO and a disk resource distribution between the logic volumes is controlled. Therefore, when the input/output to/from some logic volume frequently occurs, input/output performance for the other logic volume deteriorates. For instance, in the case where a volume A in which it is desired to guarantee 10 IOPS and a volume B in which it is desired to guarantee 50 IOPS are arranged to the same disk, if the access to the volume A frequently occurs, the IOPS of the volume A rises from 10 IOPS to 20 IOPS although it is unnecessary to rise. Contrarily, the IOPS of the volume B decreases from 50 IOPS to 40 IOPS although the user does not want to reduce it.

(Resource Distribution Between Ordinary Process and Backup/copying Process)

A case where a plurality of logic volumes exist on the same disk apparatus and a backup or copying process is executed on a logic volume unit basis in the conventional storage system will now be considered. Hitherto, in order to suppress an influence on the ordinary input/output by the backup/copying process, a method whereby a pace (interval) of the backup/copying process is set at the time of executing the backup/copying process. However, when the copying process is executed to the volume B on the same disk apparatus as that of the volume A during the copying process of the volume A, the duplex copying processes are simultaneously operated on the same disk apparatus, so that the influence on the ordinary input/output is doubled.

(Resource Distribution Between Ordinary Process and Rebuilding)

In the RAID apparatus, by making data redundant among a plurality of disk drives, even if a failure occurs in one disk drive, the data can be recovered from the remaining disk drives. Consequently, in the RAID apparatus, even when the failure occurs in any disk drive, the ordinary input/output can be continued. The data is recovered from the remaining disk drives to an exchanged disk drive. The recovering process is called "rebuilding". Since the rebuilding is accompanied with the input/output process for the disk drives constructing the RAID apparatus, the rebuilding and the ordinary input/output scramble for the same disk drive. Consequently, the performance of the ordinary input/output deteriorates due to the rebuilding. For example, in case of RAID1 having a mirror structure, the rebuilding is a process for copying data from one disk drive which remains due to the failure of the disk drives to the exchanged new disk drive and a read input/output is generated to the disk drive on the copying source side. The read input/output causes the ordinary input/output to be waited, so that the performance of the ordinary input/output deteriorates. Hitherto, there are two approaches to solve the above problem. According to the first approach, enough small data is copied at an enough long interval so as not to exert an influence on the ordinary input/output. In this case, although the influence on the ordinary input/output can be reduced, a time until the completion of the rebuilding becomes long. For instance, in case of RAID1 constructed by a disk drive of 9 GB, a time of about 10 hours is needed. According to the second approach, when the disk drive is available, namely, the disk drive is not used in the ordinary input/output, the inputs/outputs of the rebuilding are scheduled. A problem in this case is that the time until the completion of the rebuilding cannot be guaranteed. When the disk drive is hardly available, it takes long time for rebuilding.

(Guarantee of Maximum Response Time)

In a mission critical operation, as requirements of the input/output performance, the maximum response time is important in addition to the average response time. A recent disk apparatus has a re-ordering function for rearranging execution waiting inputs and outputs so as to minimize the processing time. The re-ordering function is such a function that an input/output to minimize a positioning time that is defined by the sum of a seeking time and a rotation waiting time is selected by the disk apparatus as an input/output to be executed next from the execution waiting inputs/outputs. When the input/output is requested to the disk apparatus, a simple task serving as a task designation indicating that the input/output can be set as a target of the re-ordering is notified to the disk apparatus. In case of the inputs/outputs of the simple task designation, the disk apparatus schedules the inputs and outputs so as to minimize the positioning time. Consequently, the average processing time at the time of the random access is reduced. For example, the average processing time for the random access decreases from 9 msec to 5 msec by using the re-ordering function. Although the re-ordering function improves the throughput of the disk apparatus as mentioned above, there is a problem that the maximum response time increases. This is because since the input/output to minimize the positioning time is selected as a next input/output, such a phenomenon that some input/output is waited for a long time without being not scheduled occurs. In order to solve such a phenomenon, the disk apparatus has a function for designating an ordered task in addition to the simple task for designating that the input/output can be set as a target of the re-ordering. If the input/output is requested by designating the ordered task, the disk apparatus completes all of the incomplete inputs/outputs which have been received so far and, after that, schedules the inputs/outputs of the ordered task. By mixing the ordered task between the simple tasks as mentioned above, the extension of the maximum response time of the input/output can be suppressed. However, in case of considering the resource distributions between the random access and the sequential access, between the logic volumes, and between the ordinary process and the backup/copying process or rebuilding process, in addition to the use of the simple task to improve the throughput (IOPS), it is necessary to also consider the guarantee of the maximum response time in case of using the simple task.

SUMMARY OF THE INVENTION

According to the present invention, there are provided disk time-sharing apparatus and method which can guarantee the minimum performance of inputs/outputs when a plurality of different kinds of inputs and outputs compete in a disk apparatus.

A disk time-sharing apparatus according to the invention comprises: a disk apparatus having one or a plurality of disk drives; an input/output request unit for issuing an input/output request to the disk apparatus; an input/output scheduling unit; and an allocating time control unit. Among them, the input/output scheduling unit forms input/output groups obtained by grouping inputs and outputs to/from the disk apparatus, defines a ratio of times during which each input/output group uses the disk apparatus, determines quanta $\tau 1$, $\tau 2$, and $\tau 3$ (allocating times) during which each input/output group can continuously use the disk apparatus on the basis of the defined time ratio, and performs such a time-sharing that when input/output requests are received from a plurality of input/output groups to the disk apparatus, the quanta $\tau 1$, $\tau 2$, and $\tau 3$ are sequentially switched among the input/output groups in which the input/output requests compete, the disk apparatus is used. Further, the allocating time control unit allows the allocating time to be dynamically fluctuated in accordance with a degree of jam of the input/output processing requests of the input/output groups. According to the disk time-sharing apparatus of the invention as mentioned above, in the case where inputs and outputs are divided into a plurality of input/output groups such as random access, sequential access, copy (sequential), and the like and quanta are allocated to them, when input/output requests of a specific input/output group are reduced and a surplus time is caused in its quantum, the surplus time is dynamically distributed to the quantum of the other input/output group which issues many input/output requests. Consequently, it is possible to efficiently access to the disk apparatus without causing an idle time. The allocating time control unit distributes the surplus allocating time of the input/output group having the small number of processing requests by extending the allocating time of the input/output group having many processing requests. The allocating time control unit distributes the surplus allocating time of the input/output group having the small number of processing requests by increasing a frequency without changing its allocating time of the input/output group having the large number of processing requests.

According to the invention, when the surplus time of the quantum occurring in any one of a plurality of input/output groups is distributed to the quantum of the other input/output group having many input/output requests, it is fixedly distributed in accordance with the ratio which was initially set. In the case where the input/output groups are classified into groups for the random access, sequential access, copying access, and the like, however, when it is assumed that a surplus time is caused in the sequential access and the number of input/output requests of the copying access is accidentally large, the surplus time is distributed to the copying access. Consequently, there is a fear that the response time of the random access is sharply extended. According to the invention, the input/output scheduling unit forms two or more upper groups by combining a plurality of input/output groups and the allocating time control unit distributes the surplus time among the input/output groups only in each upper group. For example, the random access and the sequential access are inserted into a normal system group, the copying access is inserted into an abnormal system group, and the distribution of the surplus time between the upper groups is forbidden, so that the surplus time of, for example, the sequential access can be distributed to the random access in the upper groups and its response time can be guaranteed. The allocating time control unit can also distribute the surplus time between the upper groups. In this case, when each of the input/output groups which belong to a certain upper group has a surplus time, the allocating time control unit distributes the surplus time to the input/output group having many processing requests of the other upper group. In the case where a part of the input/output groups which belong to a certain upper group has a surplus time, the allocating time control unit distributes the surplus time to the input/output group having many processing requests of the other upper group. Further, when there is no input/output group which can completely use the surplus time in the upper group on the distributing destination side, the allocating time control unit does not distribute the surplus time to the other upper group. The input/output scheduling unit sets a priority for each upper group. The allocating time control unit sequentially checks a degree of jam of the input/output requests from the upper groups of a high priority and distributes the surplus time of the upper group to the other upper group having many input/output processing requests. The allocating time control unit also sequentially checks a degree of jam of the input/output requests from the upper group of a low priority and can distribute the surplus time of the upper group to the other upper group having many input/output processing requests. Further, the allocating time control unit distributes the surplus time from the upper group of a low priority only to the upper group of a high priority, so that the surplus time occurring by, for example, the copying access of the abnormal system is reflected to the random access or sequential access of the normal system and the response time or throughput can be guaranteed. The allocating time control unit can also distribute the surplus time of the upper group to the other previously designated arbitrary upper group. The allocating time control unit distributes a surplus allocating time of the input/output group which belongs to a certain upper group and has the small number of input/output processing requests by extending the allocating time of the input/output group which belongs to the other upper group and has the large number of input/output processing requests or by increasing a frequency without changing the allocating time of the input/output group.

According to the invention, there is provided a disk time-sharing method for a disk time-sharing apparatus comprising a disk apparatus having one or a plurality of disk drives, an input/output request unit for issuing an input/output request to the disk apparatus, and an input/output scheduling unit for scheduling the use of the disk apparatus on the basis of the input/output request.

According to the disk time-sharing method, input/output groups obtained by grouping inputs and outputs to/from the disk apparatus in accordance with their kinds are formed and an allocating time (quantum) during which each input/output group can successively use the disk apparatus is defined,
when input/output requests are received from a plurality of input/output groups to the disk apparatus, the disk apparatus is used by sequentially switching the allocating times among the input/output groups which compete with each other, and
the allocating time is fluctuated in accordance with a degree of jam of input/output processing requests of the input/output groups.

Also in this case, the surplus allocating time of the input/output group having the small number of processing requests is distributed by extending the allocating time of the input/output group having the large number of processing requests or by increasing a frequency without changing the allocating time of the input/output group having the large number of processing requests. Further, two or more upper groups are formed by combining a plurality of input/output groups and the surplus time is distributed among the input/output groups only in the upper groups or the surplus time is distributed among the upper groups. The other detailed construction is similar to those of the apparatus.

According to another embodiment of the invention, group queues are provided for the input/output scheduling unit in correspondence to input/output groups and a definition table to set a valid flag or an invalid flag of time-sharing is provided every group queue. When the valid flag is recognized on the input/output unit side with reference to the definition table, an input/output request is issued to the input/output scheduling unit. When the invalid flag is recognized, an input/output request is directly issued to the disk apparatus.

When the input/output requests in which the invalid flag is recognized with reference to the definition table continue, the input/output request unit directly issues the input/output request to the disk apparatus and, thereafter, directly issues the next input/output request to the disk apparatus after the elapse of a predetermined idle time. Thus, the user can freely decide the input/output group to which the time-sharing is performed and the input/output group to which the time-sharing is not performed.

According to still another embodiment of the invention, group queues are provided for the input/output scheduling unit in correspondence to input/output groups and, in the case where the end of error is received after the input/output request was extracted from the group queues and issued to the disk apparatus, the input/output request in which the error ended is again stored into the group queue and processed. In this case, the input/output request in which the error ended is again stored to the head or end of the group queue or the input/output request is directly issued to the disk apparatus.

The above and other objects, features, and advantages of the present invention will become more apparent from the following detailed description with reference to the drawings.

BRIEF DESCRIPTION OF THE DRAWINGS

FIGS. 2A and 2B are functional block diagrams of an embodiment of the invention in which a plurality of input/output groups are formed;

FIG. 3 is a schedule explanatory diagram of a disk time-sharing process in FIGS. 2A and 2B in which inputs and outputs of three input/output groups are set to targets;

FIG. 4 is a schedule explanatory diagram of the disk time-sharing process in FIGS. 2A and 2B in which inputs and outputs of only one input/output group continue;

FIGS. 5A to 5J are explanatory diagrams of contents of a calculation to obtain remaining time for transmitting an input/output request after the switching of the next quantum;

FIGS. 6A to 6C are explanatory diagrams showing the case of transmitting the input/output request of up to two quanta to a disk apparatus in the embodiment of FIGS. 2A and 2B;

FIGS. 9A to 9C are explanatory diagrams of an allocating time control in which another quantum waiting time is extended in correspondence to a surplus time of the quanta;

FIGS. 10A to 10C are explanatory diagrams of an allocating time control in which only the own waiting time is extended in correspondence to the surplus time of the quanta;

FIGS. 11A to 11F are time charts for an allocating control according to FIGS. 2A and 2B in the case where a large amount of input/output requests continuously flow into the all quanta;

FIGS. 12A to 12F are time charts for an allocating time control according to FIGS. 2A and 2B in the case where a large amount of input/output requests flow into one quantum;

FIGS. 13A to 13F are time charts for an allocating time control according to FIGS. 2A and 2B in the case where an input/output request which does not reach an initial allocation flows into all quanta;

FIGS. 14A to 14E are explanatory diagrams of an allocating time control for increasing a frequency of other quanta in correspondence to the surplus time of the quanta;

FIGS. 15A to 15G are explanatory diagrams of an allocating time control for increasing only the own frequency in correspondence to the surplus time of the quantum;

DETAILED DESCRIPTION OF THE PREFERRED EMBODIMENTS

Figure 1:
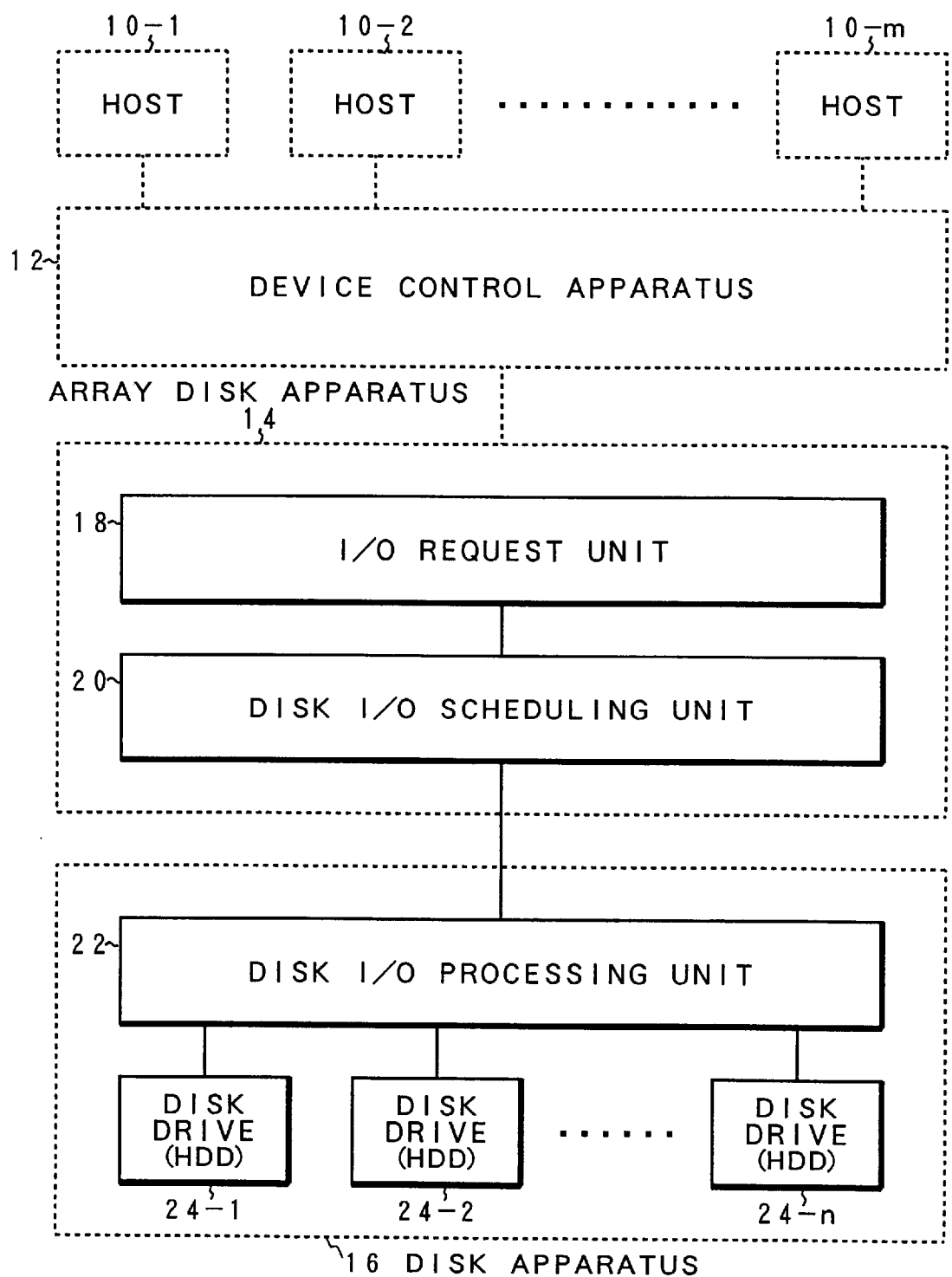
FIG. 1 is a block diagram of a storage system to which the invention is applied.

FIG. 1 is a block diagram of a storage system to which the invention is applied. The storage system is constructed by a device control apparatus 12, an array disk apparatus 14, and a disk apparatus 16. Hosts 10-1 to 10-m are connected to the device control apparatus 12 and request the input/output to the device control apparatus 12 by applications of the hosts 10-1 to 10-m. The array disk apparatus 14 receives the input/output request from the device control apparatus 12 and issues the received input/output request to the disk apparatus 16. The disk time-sharing apparatus of the invention is constructed by: an input/output request unit 18 and a disk input/output scheduling unit 20 provided in the array disk apparatus 14; and a disk input/output processing unit 22 and disk drives 24-1 to 24-n provided in the disk apparatus 16. When the plurality of disk drives 24-1 to 24-n provided in the disk apparatus 16 have an RAID construction, an RAID control mechanism is further provided for the array disk apparatus 14.

FIGS. 2A and 2B are block diagrams of a fundamental embodiment of a time-sharing apparatus of the invention applied to the storage system of FIG. 1 and show a disk apparatus of an RAID construction as an example. The array disk apparatus 14 comprises: the input/output request unit 18; an RAID control unit 26; and the disk input/output scheduling unit 20. The disk input/output processing unit 22 is provided for the disk apparatus 16. For example, the two disk drives 24-1 and 24-2 having a construction of RAID1 (mirror disk construction) are connected to the disk input/output processing unit 22. The disk time-sharing apparatus of the invention executes processes in such a manner that the input/output requests from the input/output request unit 18 to the disk apparatus 16 are grouped to thereby form input/output groups, a ratio of time during which each input/output group uses the disk apparatus 16 is defined, a quantum (allocating time) during which each input/output group can continuously use the disk apparatus is determined on the basis of the defined time ratio, and in the case where the requests are received from the plurality of input/output groups, the quanta are sequentially switched among the input/output groups which competed, thereby scheduling so as to use the disk apparatus 16. The quantum is dynamically fluctuated in accordance with a degree of jam of the input/output requests among the input/output groups, thereby realizing the efficient use of the disk apparatus 16.

A construction and functions of each unit in FIGS. 2A and 2B for realizing the disk time-sharing process of the invention as mentioned above will be described further in detail hereinbelow. For example, the input/output request to the disk apparatus 16 is issued from the input/output request unit 18 to the disk input/output scheduling unit 20 through the RAID control unit 26 on the basis of a command from the upper device control apparatus 12 shown in FIG. 1. The RAID control unit mainly performs a process for converting a requested logic input/output request to a physical input/output request. The disk input/output scheduling unit 20 has disk time-sharing control information 30-1 and 30-2, an input/output scheduling unit 32, an input/output request receiving unit 34, and an input/output completion processing unit 36. The disk time-sharing control information 30-1 and 30-2 are provided on a unit basis of the disk drives 24-1 and 24-2 provided for the disk apparatus 16. The input/output scheduling unit 32 performs a disk time-sharing by referring to and updating the disk time-sharing control information 30-1 and 30-2 provided on a unit basis of the disk drives 24-1 and 24-2. The input/output scheduling unit 32 also has a function of an allocating time control unit 35 and dynamically fluctuates a quantum in accordance with a degree of jam of the input/output requests in each input/output group.

There are the following two methods of distributing the surplus time by the allocating time control unit 35.

I. Extension of quantum by the surplus time

II. Increase in frequency of the quantum by the surplus time

That is, the allocating time control unit 35 distributes the surplus time of the input/output group in which the number of processing requests is small by extending the quantum of another input/output group in which the number of processing requests is large or distributes it by increasing the frequency without changing the quantum. The disk time-sharing control information 30-1 will now be described. In the embodiment, the case where the input/output groups are classified into three groups G1, G2, and G3 and defined is explained as an example. Schedule waiting group queues 38-1 to 38-3 are provided in correspondence to the input/output groups G1 to G3. In the schedule waiting group queues 38-1 to 38-3, the input/output requests received by the input/output request receiving unit 34 are stored into FIFOs constructing the queues, so that they are arranged. Completion waiting group queues 40-1, 40-2, and 40-3 are provided in correspondence to the input/output groups G1 to G3. In the completion waiting group queues 40-1 to 40-3, the input/output requests in which the input/output request for the disk apparatus 16 has been completed and an input/output completion response is not received from the disk apparatus 16 are stored in FIFOs constructing the queues, so that they are arranged. Further, quanta 42-1, 42-2, and 42-3 for groups are provided in correspondence to the input/output groups G1 to G3. In the quanta 42-1 to 42-3 for groups, ratios α1, α2, and α3 of times during which the input/output groups G1 to G3 use the disk apparatus 16 are previously defined, and quanta τ1, τ2, and τ3 serving as allocating times during which the input/output groups G1 to G3 can continuously use the disk apparatus 16 are determined on the basis of the defined ratios α1, α2, and α3 and stored. For example, now assuming that a time-sharing period for performing the time-sharing once is set to Tc, the quanta τ1, τ2, and τ3 of the input/output groups G1 to G3 are defined by the following equations.

$$\tau1=\alpha1 \cdot Tc$$

$$\tau2=\alpha2 \cdot Tc$$

$$\tau3=\alpha3 \cdot Tc$$

Optimum values of the quanta τ1, τ2, and τ3 to determine the use of the disk apparatus 16 by the input/output groups G1 to G3 are decided as follows. First, the quantum approaches the input/output processing time of the disk apparatus 16 if its value is set to a too small value, an effect of re-ordering for selecting the input/output so as to minimize a positioning time decreases, and the whole input/output performance deteriorates. On the contrary, if the value of the quantum is too large, a waiting time of the quantum that is required to switch to another input/output group is extended, so that an average input/output processing time and a maximum input/output processing time are extended. For example, if the quanta τ1 and τ2 are set to one hour, respectively, since the input/output of the quantum τ2 cannot be executed during the process of the quantum τ1, the input/output of the quantum τ2 is allowed to wait for the end of the quantum τ1 for one hour. According to the experiments of the inventors of the present invention, in case of the disk apparatus 16 in which the average processing time of the input/output is equal to a few msec to 20 msec, it is desirable to set the quantum to a value within a range from tens of msec to hundreds of msec. As inputs/outputs to be grouped by the disk input/output scheduling unit 20, for example, there are the following grouping methods.

I. sequential access
II. random access
III. copy/backup process
IV. rebuilding process of RAID Among them, the random access and the sequential access belong to the normal system process and the copy/backup process and the rebuilding process belong to the abnormal system process. Therefore, the input/output groups of the disk time-sharing control information 30-1 can be classified into, for example, a random access group, a sequential access group, and an abnormal system group. Further, a kind 44 of present quantum, a start time 46 of present quantum, and further, a kind 48 of next input/output task are provided in the disk time-sharing control information 30-1. The present quantum kind 44 is provided for each of the disk drives 24-1 and 24-2 of the disk apparatus 16 and identifiers of the input/output groups which use the disk drives 24-1 and 24-2 at present are set. The present quantum-start time 46 is provided for each of the disk drives 24-1 and 24-2 of the disk apparatus 16 and a time T0 which has been set in the quantum identifier and at which the present quantum was started is set. Further, the next input/output task kind 48 is provided for each of the disk drives 24-1 and 24-2 of the disk apparatus 16, and whether the input/output request to the next disk drive is set to the simple task or ordered task is set. The simple task or the ordered task which is set to the next input/output task kind 48 is performed to make the most of the effect of the re-ordering function in the disk apparatus 16. The re-ordering function in the disk apparatus 16 is such a function that an input/output for minimizing a positioning time which is given by the sum of a seeking time and a rotating time is selected as an input/output to be executed next from the inputs/outputs whose execution is waited with respect to each of the disk drive 24-1 or 24-2. In case of requesting an input/output to the disk apparatus having such a re-ordering function, if the simple task is designated, the disk drive is notified of the fact that the input/output can be set to a target of the re-ordering. The disk drive which received the input/output in which the simple task has been designated schedules the inputs/outputs in such an order as to minimize the positioning time. However, since the re-ordering function always selects the input/output whose positioning time becomes the minimum, such a phenomenon that a certain input/output is not scheduled in a waiting state for a long time occurs. To solve such a phenomenon, the disk drive has a function of an ordered task besides the simple task. If the ordered task is designated and the input/output is requested, the disk drive completes all of the incomplete inputs/outputs inherited so far and, thereafter, schedules the inputs/outputs of the ordered task. Therefore, by mixing the ordered task between the simple tasks, the extension of the maximum response time of the input/output can be suppressed. In the disk time-sharing process of the invention, the first input/output after the switching of the quantum is requested to the disk apparatus 16 by designating the ordered task, the incomplete inputs/outputs before the switching of the quantum are completed, and after that, the inputs/outputs of the next quantum are executed. Therefore, the simple task is designated with respect to the second and subsequent inputs/outputs after the switching to the quantum. In the case where there are only the inputs/outputs from one input/output group, in order to continue the scheduling of the input/output group, the scheduling is repeated while resetting the quantum. In this case, the first input/output just after the quantum was reset is requested by the ordered task. After all of the inputs/outputs which were not completed in the one-previous quantum are completed and, the inputs/outputs of the quantum after the resetting are scheduled. Therefore, the extension of the maximum response time in the case where the inputs/outputs of a plurality of input/output groups compete and in the case where only the inputs/outputs of only one input/output group are allowed to continue can be prevented.

FIG. 3 shows an example of the scheduling of the disk time-sharing by the input/output scheduling unit 32 provided for the disk input/output scheduling unit 20 in FIGS. 2A and 2B and relates to a case where there is no surplus time. In a competing state where the input/output requests have been stored in the schedule waiting group queues 38-1 to 38-3 of the disk time-sharing control information 30-1 with respect to the input/output groups G1 to G3, the inputs/outputs are scheduled in order of the groups G1 to G3 in accordance with the quantum allocating times τ1, τ2, and τ3 determined for the respective input/output groups G1 to G3 and the input/output is requested to the disk apparatus 16. For example, the two inputs/outputs of the input/output group G1 are scheduled for the quantum waiting time τ1 from time t0. As for the quantum switching, it is switched to the quantum of the next input/output group at a point when the time at a point when the input/output is completed exceeds the present quantum switching time. This switching is discriminated by the following inequality.

$$\text{(input/output start time of the present quantum)} < \text{(present quantum start time} + \text{quantum)} \quad (1)$$

That is, if the inequality (1) is satisfied, the input/output of the input/output group corresponding to the kind of present quantum is requested to the disk apparatus. If it is not satisfied, the quantum is switched to the quantum of the next input/output group. For example, six inputs/outputs have been scheduled during the quantum allocating time $\tau 2$ of the next input/output group G2. Further, when the quantum allocating time $\tau 2$ elapses at time t2, the quantum is switched to the quantum allocating time $\tau 3$ of the input/output group G3 and, for example, the three inputs/outputs of the input/output group G3 are scheduled. In a manner similar to the above, the quantum allocating times $\tau 1$, $\tau 2$, and $\tau 3$ are switched and the inputs/outputs of each input/output group are scheduled.

FIG. 4 shows an example of a time-sharing process in the case where only the inputs/outputs of a specific input/output group continue. It is now assumed that the inputs/outputs of only the input/output group G1 are arranged in the schedule waiting group queue 38-1 in FIGS. 2A and 2B at time t0 and the schedule waiting group queues 38-2 and 38-3 of the remaining input/output groups G2 and G3 are empty. In this case, after the two inputs/outputs of the input/output group G1 were scheduled for the quantum allocating time $\tau 1$ of the input/output group G1 from time t0, by resetting the quantum allocating time $\tau 1$ at time t1, the quantum waiting time $\tau 1$ of the next same input/output group G1 is restarted and, for example, three inputs/outputs are scheduled. When only the inputs/outputs of one input/output group are in the waiting state as mentioned above, by resetting the quantum, the inputs/outputs of one input/output group are continuously scheduled. Further, in FIG. 4, since the inputs/outputs of the three input/output groups G1 to G3 enter the competing state at time t2, the quantum is switched to the next quantum allocating time $\tau 2$.

Upon scheduling of the disk time-sharing shown in FIGS. 3 and 4, as for the request of the input/output to the disk drive, the input/output just after the switching of the quantum is requested by the ordered task and the input/output until the second and subsequent next quantum switching is requested by the simple task. As mentioned above, to make the most of the re-ordering function of the disk drives 24-1 and 24-2, when the quantum is switched, a time that is required until the completion of all of the input/output requests requested at present to the disk drives 24-1 and 24-2 is predicted. If the predicted time lies within the quantum after the switching, the input/output of the quantum is requested after the switching. When the predicted time exceeds the quantum after the switching, the apparatus waits for the switching to the next quantum without requesting the input/output after the switching. This is because in order to receive benefit of the re-ordering of the disk apparatus 16, an environment adapted to request a large number of inputs/outputs to/from the disk apparatus 16 as many as possible is formed in the disk input/output scheduling unit 20. In case of using the simple task, a plurality of input/output requests are requested to the disk apparatus. Since the disk time-sharing of the present invention intends to perform a time-divisional control of the input/output processing time in the disk apparatus, when the input/output is requested to the disk apparatus, the time necessary for processing the plurality of requested requests by the disk apparatus is predicted and it is necessary to discriminate whether the input/output per quantum kind after the switching is issued to the disk apparatus or not after the quantum was switched to the next quantum. Therefore, a remaining time $\tau_r$ to discriminate whether the request requested to the disk drive at present has been completed in the next quantum and a new input/output request can be issued upon quantum switching or not is calculated by the following equations.

$$\tau_r = T0 + \tau - Tw - T\text{now} \quad (2)$$

where,

T0: quantum start time (prediction value)

$\tau$: quantum allocating time

Tw: I/O unprocessing time (prediction time)

Tnow: present time $$T0 = Ts + Tw \quad (3)$$

where,

Ts: quantum start time before switching $$Tw = N \times Ta \quad (4)$$

where,

N: the number of unprocessing I/O

Ta: average processing time of I/0 per access kind

The "unprocessing I/O" denotes an input/output in which a completion response is not returned although the input/output request is issued to the disk apparatus. In case of the embodiment of the invention, the unprocessing I/O are classified into a one-previous unprocessing I/0, a two-previous unprocessing I/O, and all-unprocessing I/O. They denote the unprocessing I/O of the quantum just before the present quantum, the unprocessing I/O of the two-previous quantum, and the unprocessing I/O through all of the quanta, respectively. The quantum start time T0 is also a prediction value and is predicted when the switching to the present quantum has been determined by the remaining time prediction of the one-previous quantum. In this instance, the time Tw that is necessary for completion of all processes of the unprocessing I/O of the one-previous quantum on the disk apparatus is predicted by the equation (4), and the end time of the one-previous quantum on the disk apparatus, namely, the start time T0 of the present quantum is predicted by the equation (3). The remaining time $\tau_r$ in the equation (2) is calculated in the case where the disk input/output scheduling unit receives a new input/output or in the case where it receives the completion response of the input/output from the disk apparatus. If the remaining time $\tau_r$ is $$\tau_r > 0,$$

it is determined that there is the remaining time, and the input/output of the present quantum is issued to the disk apparatus. If the remaining time $\tau_r$ is $$\tau_r \leq 0,$$

it is determined that there is no remaining time, and the quantum is switched.

As a method of calculating the average input/output processing time Ta of the disk drive which is used for calculation of the remaining time $\tau_r$ in the inequality (1), for example, the average value of the (n) input/output processing times just before the present time is used. In this case, (n) can be set to a finite value of, for example, n=10 or the average value of the processing times of n=$\infty$, namely, all of the inputs/outputs from the start of the system can be also used. Further, as for the calculation of the average value of the input/output processing times, either a method of calculating the average value every input/output group or a method of calculating the average value of all of the input/output groups can be used. In case of accessing a large amount of data, since the positioning time is shorter than the data transfer time, the average input/output processing time Ta is predicted on the basis of an amount of data to be accessed and a transfer ability of the disk drive. In this case, the positioning time differs depending on to which extent it can receive the benefit of the re-ordering function, namely, in dependence on the number of inputs/outputs to be subjected to the re-ordering in the disk drive at that time, a degree of dispersion of addresses of the respective input/output requests, or the like. In case of accessing a large amount of data, however, since a ratio of the positioning time which occupies the processing time is small, the processing time in this case is predicted as follows.

(Average positioning time)+(data transfer time)

For example, in case of accessing data of 1 MB by the disk drive in which a transfer speed is equal to 20 MB/sec, an average rotation waiting time is equal to 3 msec, and an average seeking time is equal to 5 msec, since the transfer time is equal to 52 msec while the average positioning time is equal to 8 msec, the processing time is set to 60 msec obtained by adding both of those times.

FIGS. 5A to 5J relate to an example of prediction of the remaining time upon quantum switching and show an example in the case where the time elapses as shown in FIGS. 5A to 5J with respect to the case where the sequential quantum and the random quantum are alternately repeated.

FIGS. 5A and 5B show an example of predicting the next quantum start time T0 upon switching from the random quantum to the sequential quantum. It is now assumed that the remaining time of the random quantum becomes insufficient at present time Tnow when the quantum has been switched to the random quantum. In this instance, the completion response of one request of the sequential I/O of the one-previous quantum and the completion responses of three requests of the random I/O of the present quantum are not returned and those requests are being processed by the disk apparatus. In this case, as shown in FIG. 5B, a time Tw1 that is required until the completion of all of the I/O which have been issued to the disk apparatus and are being processed is predicted by the equation (4). The start time T0 of the next sequential quantum is determined by the equation (2). The quantum is switched to the sequential quantum.

FIGS. 5C, 5E, and 5F show an example in the case where it is determined by the prediction of the remaining time that there is the remaining time. In FIG. 5B, after the quantum was switched to the sequential quantum, it is assumed that the disk input/output scheduling unit has received one request of the sequential I/O at present time Tnow. At this time, there is one request of the random I/O as an unprocessing I/O in which the completion response is not returned in the I/O request requested to the disk apparatus. That is, the disk apparatus is processing one request of the random I/O of the one-previous quantum. In this case, as shown in FIG. 5E, a time Tw2 that is required until one request of the random I/O is completed in the disk apparatus is predicted by the equation (4). A remaining time $\tau_{r2}$ is obtained by the equation (2) as shown in FIG. 5F by using the quantum start time T0 obtained in FIG. 5B. In this case, since $\tau_{r2} > 0$, the sequential I/O can be issued to the disk apparatus.

FIGS. 5G, 5H, 5I, and 5J show an example in which it is determined by the prediction of the remaining time that there is no remaining time. It is assumed that the time further advances and the disk input/output scheduling unit has received one request of the sequential I/O at present time Tnow in FIG. 5G. At this time, there is one request of the sequential I/O as an unprocessing I/O in which the completion response is not returned in the I/O request requested to the disk apparatus. That is, the disk apparatus is processing the one request of the sequential I/O of the present quantum. In this case, as shown in FIG. 5I, a time Tw3 that is required until one request of the sequential I/O is completed in the disk apparatus is predicted by the equation (4). A remaining time $\tau_{r3}$ is obtained by the equation (2) as shown in FIG. 5J by using the quantum start time T0 obtained in FIG. 5B. In this case, since $\tau_{r3} < 0$, it is determined that there is no remaining time, and the quantum is switched to the next random quantum.

FIGS. 6A to 6C are explanatory diagrams of a state where the input/output request is issued to the disk apparatus 16 in FIGS. 2A and 2B. In the invention, in response to the input/output request transmitted to a device adapter DA to which the disk apparatus 16 is connected at a certain quantum, pipeline-like processes for starting the input/output request of the next quantum before all responses are obtained can be performed. Therefore, if the input/output request is previously continuously transmitted before the response is obtained, too many input/output requests remain on the device adapter DA side, so that a response cannot be guaranteed. On the contrary, if the I/O request of the present quantum is transmitted after waiting for all responses of the I/O requests which have been transmitted before, a time that is required to arrange the input/output requests in the queue of the disk apparatus 16 becomes vain. In the embodiment, therefore, only two continuous quanta can be pipeline processed. For example, when there are continuous quanta $\tau 1$, $\tau 2$, and $\tau 3$ as shown in FIG. 6A, as shown in FIG. 6B, in a state where the response of the two-previous sequential access and the responses of the four previous random accesses are not obtained, the request of the present quantum $\tau 3$ is inhibited.

Figure 7A:
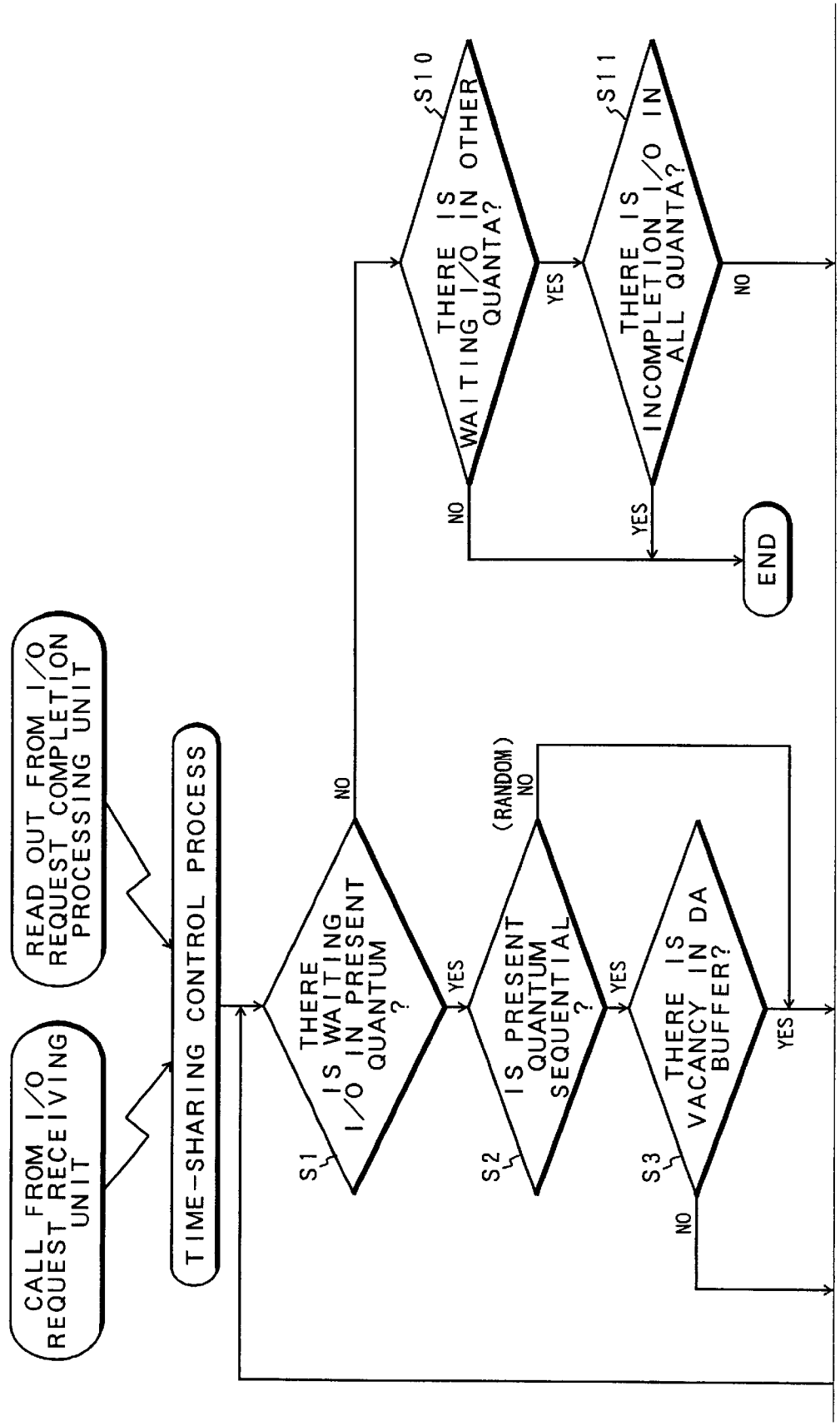
FIGS. 7A and 7B are flowcharts for the disk time-sharing process in FIGS. 2A and 2B.
Figure 7B:
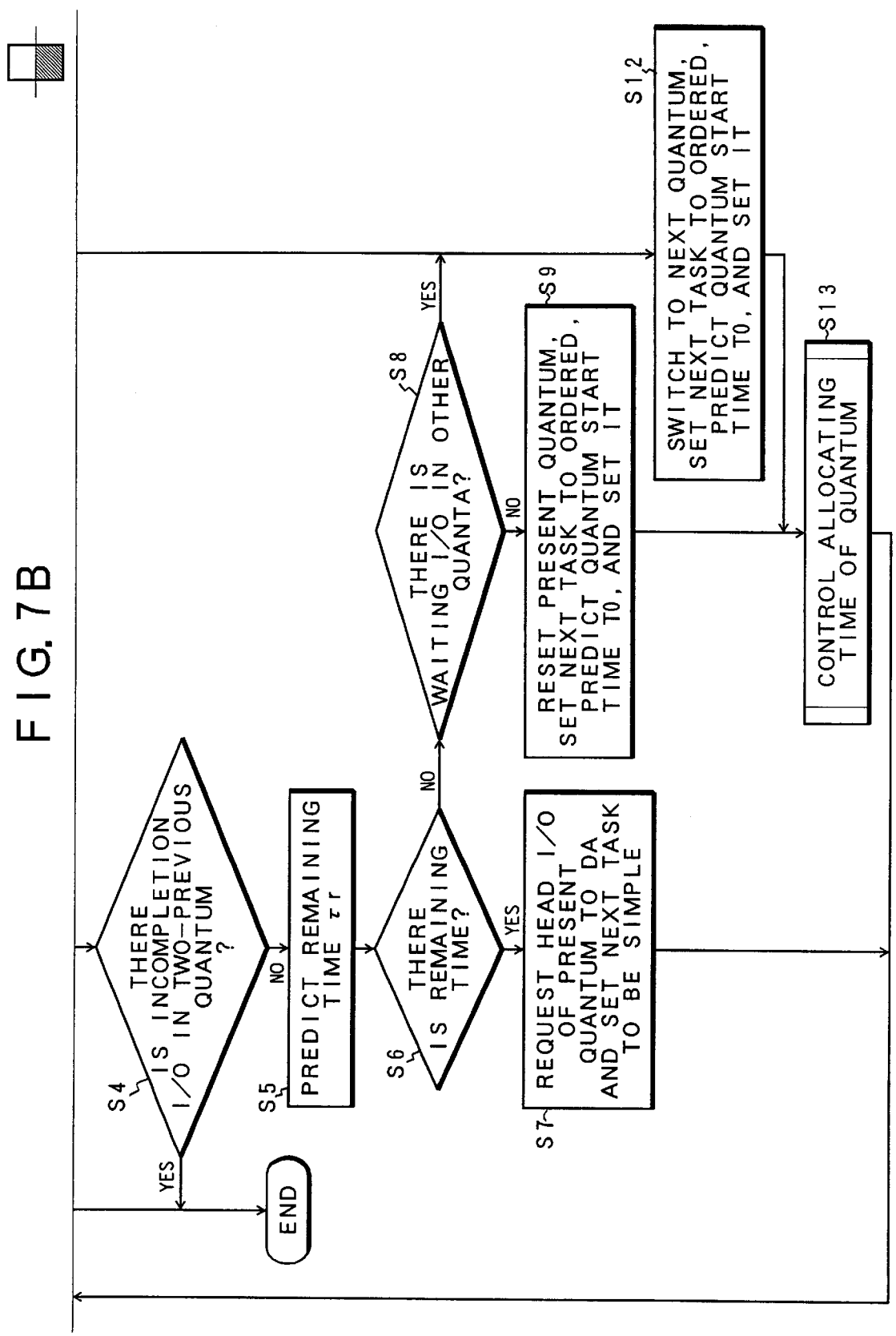

FIGS. 7A and 7B are flowcharts for the disk time-sharing control process of the invention by the input/output scheduling unit 32 provided for the disk input/output scheduling unit 20 in FIGS. 2A and 2B. The disk time-sharing control process by the input/output scheduling unit 32 is operated by receiving a call at the time when a certain input/output request is received by the input/output request receiving unit 34 from the input/output request unit 18 or a call from the timing when the input/output completion processing unit 36 generates a completion report in response to the input/output requested to the disk apparatus 16. First, an explanation will be made with respect to the case where in the disk input/output scheduling unit 20 in FIGS. 2A and 2B, the input/output groups G1 and G2 are constructed by classifying into the random access and the sequential access, the quanta $\tau 1$ and $\tau 2$ are sequentially switched between the two competed input/output groups to thereby perform the time-sharing of the disk drive 24-1. In step S1, the schedule waiting group queue 38-1 corresponding to a quantum identifier i=1 set in the present quantum kind is checked, thereby discriminating the presence or absence of the waiting input/output. If there is the waiting input/output in the schedule waiting group queue 38-1, step S2 follows and whether the present quantum is sequential or not is discriminated. If the present quantum is sequential, step S3 follows and whether there is a vacancy in a buffer of the device adapter DA or not is discriminated. If there is no vacancy, the process is finished. If there is the vacancy in the buffer of the device adapter DA, step S4 follows. In case of the random access, the processing routine advances from step S2 to step S4. In step S4, whether there is an incomplete input/output in the two-previous quantum or not is discriminated. Now, assuming that the quantum identifier i=1 indicates the first schedule, since there is no incomplete input/output in the previous quantum, step S5 follows and the remaining time $\tau_r$ is obtained from the inequality (1) and the equation (2). If $\tau_r>0$, it is determined in step S6 that there is the remaining time, so that step S7 follows. In step S7, the head input/output in the schedule waiting group queue 38-1 of the present quantum is requested to the disk drive 24-1 through the disk input/output processing unit 22 of the disk apparatus 16 and the task of the next input/output task kind information 48 is set to the simple task. Subsequently, the processing routine is returned to step S1 and whether there is a waiting input/output in the schedule waiting group queue 38-1 of the present quantum or not is discriminated. If there is the waiting input/output, the processes in steps S2 to S7 are repeated. If the absence of the remaining time is determined in step S6 in the schedule of the input/output in the quantum waiting time τ1 of the input/output group G1 as mentioned above, step S8 follows. Whether there is a waiting input/output in the schedule waiting group queue 38-2 of the sequential input/output group G2 or not is discriminated. In this instance, if there is the waiting of input/output in the schedule waiting group queue 38-2 of the next input/output group G2, step S12 follows. The quantum is switched to the quantum waiting time τ2 of the next input/output group G2 and the next task is set to the ordered task with respect to the next input/output task kind information 48. If there is not the waiting input/output in the schedule waiting group queue 38-2 of the next input/output group G2, step S9 follows. The quantum waiting time τ1 of the present input/output group G1 is reset and the next task is set to the ordered task with respect to the next input/output task kind information 48. At the same time, the quantum start time T0 is predicted and the predicted T0 is set into the start time of the present quantum. In this case, the present quantum start time is held as it is. If the schedule waiting group queue 38-1 of the input/output group G1 becomes vacant in the midway of the quantum waiting time τ1 and the absence of the waiting queue is discriminated in step S1, the processing routine advances to step S10. Whether there is a waiting input/output in the schedule waiting group queue 38-2 with respect to the other quanta or not is discriminated. In this instance, if there is the waiting input/output in the other quantum, step S11 follows. Whether there are incomplete inputs/outputs in all of the quanta or not is discriminated. If NO, step S12 follows. In step S12, the waiting time is switched to the quantum waiting time τ1 of the input/output group G1, the next task is set to the ordered task, the next quantum kind is set into the present quantum kind, further, the quantum start time T0 is predicted, and the predicted T0 is set into the present quantum start time. The processing routine is returned to step S1. The first input/output request of the input/output group G1 after the switching is requested as an ordered task to the disk drive 24-1 via the processes in steps S1 to S7. When the quantum is switched to the next quantum in step S12 or when the resetting to continue the present quantum is performed in step S9, a quantum allocating time control for distributing the present quantum surplus time to the other quanta is executed in step S13.

Figure 8:
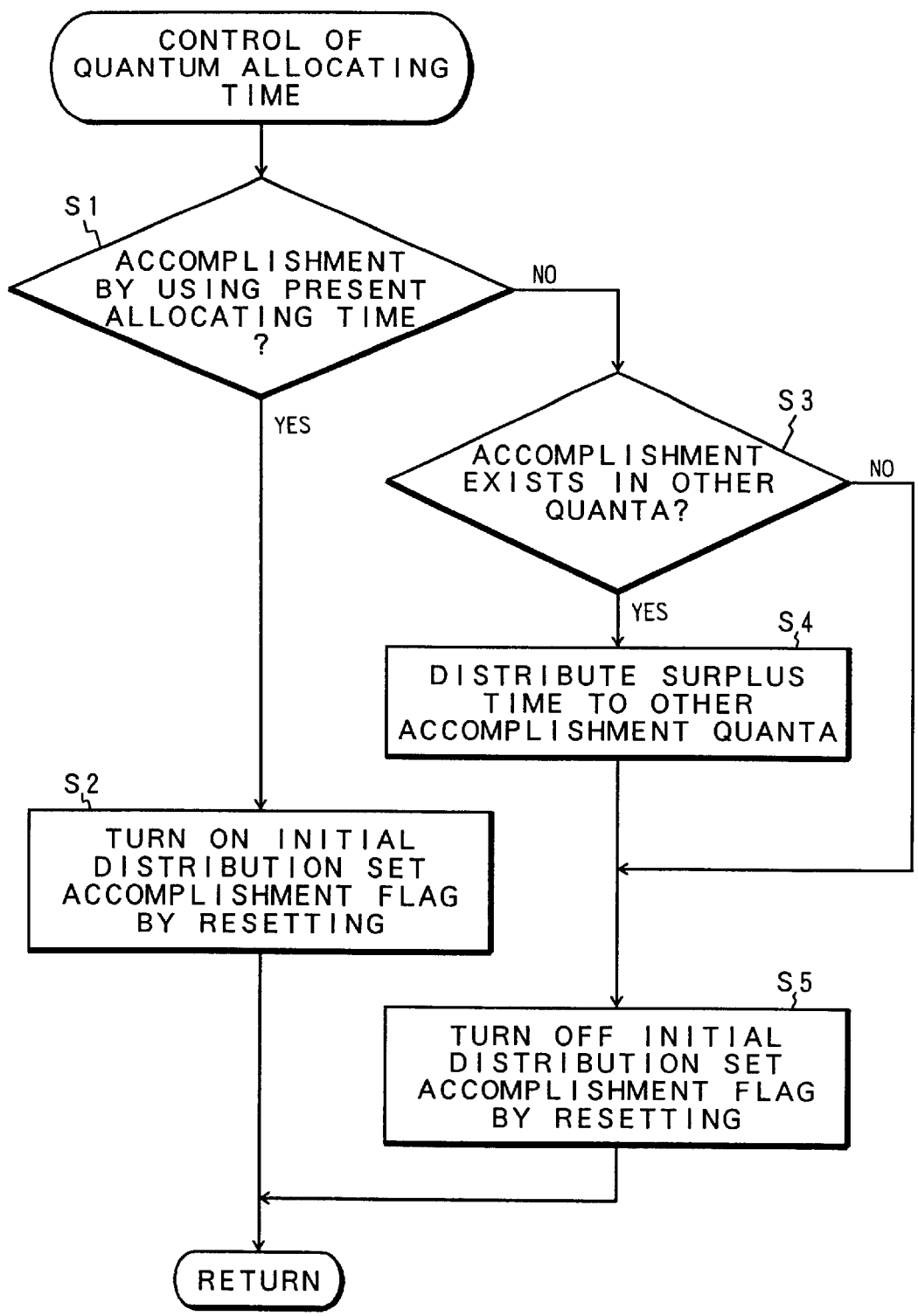
FIG. 8 is a flowchart for quantum allocating time control in FIGS. 7A and 7B.

FIG. 8 is a flowchart showing the quantum allocating time control in step S13 in FIG. 7B as a subroutine. In the quantum allocating time control, first, in step S1, a state where the present quantum allocating time is fully used is defined as "accomplishment" and whether the accomplishment in which the allocating time has fully been used is obtained or not is discriminated. In case of the accomplishment of the allocating time, step S2 follows. After setting to the initial distribution by the reset of the present quantum itself, an accomplishment flag indicative of the presence or absence of the accomplishment of the allocating time is turned on in correspondence to the accomplishment. If the allocating time is not accomplished in step S1, since there is a surplus time, step S3 follows and whether the accomplishment of the allocating time exists in another quantum or not is discriminated. If there is the accomplishment of the allocating time in another quantum, step S4 follows and the surplus time of the present quantum is distributed to another accomplishment quantum. The initial distribution is set by the reset of the present quantum in step S5 and, since the allocating time is not accomplished, the accomplishment flag is turned off. If there is not the other quantum in which the allocating time has been accomplished in step S3, the distribution of the surplus time in step S4 is not performed. The processing routine advances to step S5 and the initial distribution is set by the reset of the present quantum and, after that, the accomplishment flag is turned off because the allocating time is not accomplished.

FIGS. 9A to 9C are explanatory diagrams of the distributing process for distributing the surplus time of a certain quantum to another quantum in step S4 in FIG. 8. The embodiment is characterized in that the quantum waiting time of a distribution destination is extended in accordance with the surplus time. It is now assumed that the initial setting of the quantum allocating time with respect to the three quanta Q1, Q2, and Q3 is set to τ1, τ2, and τ3 as shown in FIG. 9A. For such an initial setting, it is assumed that the results due to the actual inputs/outputs are as shown in the result of FIG. 9B: namely, although the quantum Q1 accomplished the initial set allocating time τ1, the two remaining quanta Q2 and Q3 are shorter than the initial set allocating times τ2 and τ3 and a surplus time Δτ occurred. In this case, in the setting of the next allocating time in FIG. 9C, the allocating time τ1 of the quantum Q1 which has accomplished the allocating time is set to $$\tau 1 = \tau 1 + \Delta \tau$$

by adding the surplus time Δτ caused in the results to the initial set τ1, thereby extending the allocating time τ1 by the surplus time Δτ. On the other hand, with respect to the quanta Q2 and Q3 which could not accomplish the allocating time, the resultant times τ2 and τ3 in FIG. 9B are set.

FIGS. 10A to 10C show a control process of the allocating time in the case where the inputs/outputs of only the quantum Q1 continue in the three quanta Q1 to Q3 similar to those in FIGS. 9A to 9C. FIG. 10A relates to the initial setting and the allocating times τ1, τ2, and τ3 are set with respect to the three quanta Q1, Q2, and Q3. On the other hand, assuming that the input/output of only the quantum Q1 was performed as shown in the result in FIG. 10B, the surplus time Δτ occurs at this time. Therefore, in the next setting in FIG. 10C, the allocating time $$\tau 1 = \tau 1 + \Delta \tau$$

obtained by adding the surplus time Δτ caused in the result to the initial set allocating time τ1 of the quantum Q1 is set, thereby extending the allocating time τ1 by the surplus time Δτ. Thus, the whole surplus time Δτ is distributed to the allocating time of the quantum Q1.

With respect to the case of distributing the surplus time by extending the allocating time of another quantum as shown in FIGS. 9A to 9C and FIGS. 10A to 10C, the specific time-sharing control process of the invention in accordance with the flowchart for the quantum allocating time control in FIG. 8 will now be described with reference to time charts.

FIGS. 11A to 11F are time charts in the case where with respect to the three quanta Q1, Q2, and Q3, a number of input/output requests which accomplish the allocating time flow. FIG. 11A shows a switching order of the quanta Q1, Q2, and Q3 which are repeated by a processing cycle T1, T2, T3, . . . As for the quanta Q1 to Q3, as shown in FIG. 11B, the initial allocating times of the quantum times are set to τ1=30, τ2=20, and τ3=20. In the initial allocation, for example, the time is allocated on a millisecond unit basis. It is assumed that on the basis of the initial allocation, the same allocating times "30, 20, 20" as those of the initial allocation are set as reallocation in the T1 cycle in FIG. 11C, while the result shows only "30" of the quantum Q1 as shown in FIG. 11D. Therefore, as shown in FIG. 11E, since the quantum Q1 accomplishes the allocating time, the accomplishment flag is turned on and changed to "1". An accomplishment flag "1/1" indicates a change in accomplishment flag here. In this case, the accomplishment flags of the quanta Q2 and Q3 are held to the same value "1" as that before. Therefore, as shown in FIG. 11F, since there is no distribution amount due to the surplus time by the accomplishment of the quantum Q1, both distribution amounts for the quanta Q2 and Q3 whose accomplishment flags are set to "1" are equal to "0". In the next T2 cycle, since there is the result "20" in the quantum Q2, the accomplishment flag changes to "1/1". Also in this case, however, the distribution amounts for the quanta Q1 and Q3 are equal to "0". Further, in the T3 cycle, since there is the result "20" in the quantum Q3, the accomplishment flag changes to "1/1". Also in this case, however, the distribution amounts for the quanta Q1 and Q2 are equal to "0". As mentioned above, when a number of input/output requests exceeding the initial allocation continuously flow in all of the quanta Q1 to Q3, the time distribution between the three quanta Q1 to Q3 is not performed but the initial allocating times are repetitively used.

FIGS. 12A to 12F show a case where the same initial allocating times are set to τ1=30, τ2=20, and τ3=20 with respect to the same three quanta Q1 to Q3 as those in FIGS. 11A to 11F, a flow of the input/output requests of the quanta Q1 and Q3 is set to "10", and a number of input/output requests of the initial allocation τ2=20 or more flow in the quantum Q2. First, in the T1 cycle to switch the quantum to the quantum Q1, "30, 20, 20" are reallocated with respect to the quanta Q1, Q2, and Q3 as a reallocation in FIG. 12C. Assuming that the input/output request of "10" flowed as a result in FIG. 12D, in this case, the accomplishment flag in FIG. 12E is set to "1/0" and turned off since the result indicates the inaccomplishment. As a distribution amount in FIG. 12F, since a surplus amount due to the result "10" is equal to "20", it is equivalently distributed by "10" at a time to the quanta Q2 and Q3 whose accomplishment flags have been turned on to "1" at this time. Therefore, the reallocation in the T2 cycle for switching the quantum to the next quantum Q2 is set to "30, 30, 30" obtained by adding the distribution amount in the T1 cycle to the initial allocation. In the T2 cycle, the result of the quantum Q2 is equal to "30" and accomplishes the allocating time and the accomplishment flag changes to "1/1". In this case, since there is no surplus amount, the distribution amount is set to "0, 0, 0". In the T3 cycle for switching the quantum to the next quantum Q3, as a reallocation, with respect to the quanta Q1 and Q3, a reallocation "30, 30" obtained by adding the distribution amount "0, 0" to the reallocation "30, 30" in the one-previous T2 cycle is set. However, in the quantum Q2, since the result is equal to "30" in the T2 cycle and the allocating time is accomplished, the initial allocation "20" is reallocated by the reset. In the T3 cycle, since the result of the quantum Q3 is equal to "10" and the allocating time is not accomplished, the accomplishment flag is turned off and changes to "1/0". A remainder of the quantum Q3 in this case is equal to "20" and allocated as a distribution amount "20" to the quantum Q2 whose accomplishment flag is equal to "1". In the T4 cycle for switching the quantum to the next quantum Q1, a reallocation "30, 40, 20" obtained by adding the distribution amount "0, 20, 0" to the reallocation "30, 20, 30" in the one-previous T3 cycle is performed. Since the result of the quantum Q1 in this case is equal to "0", the allocating time is not accomplished. Since the accomplishment flag is equal to "0", a remainder "20" which changes to "0/0" occurs. In this instance, since the quantum whose accomplishment flag is turned on to "1" is only the quantum Q2, the remaining amount is distributed as a distribution amount "20" to the quantum Q2. In the next T5 cycle, "30, 60, 20" is reallocated by the addition of the reallocation in the one-previous T4 cycle and the distribution amount. Since the result of the quantum Q2 is equal to "60", the accomplishment flag is turned on to "1/1" and all of the distribution amounts in this case are equal to "0". In the next T6 cycle, the reallocation is reset to the initial allocation "20" due to the accomplishment of the allocating time "60" of the quantum Q2 by the one-previous T5 cycle. A remainder "10" due to the result "10" of the quantum Q3 is allocated as a distribution amount "10" to the quantum Q2. In the next T7 cycle, "30, 30, 20" obtained by adding the reallocation in the T6 cycle and the distribution amount is reallocated. The result of the quantum Q1 is equal to "10" and a remainder "20" in this case is distributed as a distribution amount "20" to the quantum Q2 whose accomplishment flag is equal to "1". Similar processes are repeated hereinbelow.

FIGS. 13A to 13F are time charts in the case where, for example, "20, 10, 10" repeatedly flows as an input/output smaller than that of the allocation into the three quanta Q1, Q2, and Q3 and the allocating times of all of them are not accomplished. In the T1 cycle in FIG. 13A, the initial allocation of the quanta Q1, Q2, and Q3 is equal to "30, 20, 20" as shown in FIG. 13B and the first reallocation in FIG. 13C is likewise set to "30, 20, 20". In this case, the result of the quantum Q1 is equal to "20" as shown in FIG. 13D and the allocating time is not accomplished. The accomplishment flag in FIG. 13E is turned off and changes to "1/0". A remainder "10" in this case is distributed as "5, 5" as shown in FIG. 13F to the quanta Q2 and Q3 whose accomplishment flags are turned on to "1". In the T2 cycle for switching the quantum to the next quantum Q2, "30, 25, 25" obtained by adding the distribution amount "0, 5, 5" to the reallocation "30, 20, 20" in the previous T1 cycle is reallocated. In this case, since the result of the quantum Q2 is equal to "10" and the allocating time is not accomplished, the accomplishment flag is turned off and changes to "1/0". A remainder "15" in this case is allocated as a distribution amount "15" to the quantum Q3 whose accomplishment flag has been turned on to "1". In the T3 cycle for switching the quantum to the next quantum Q3, "30, 20, 40" obtained by adding the distribution amount to the reallocation in the one-previous T2 cycle is reallocated. Since the result of the quantum Q3 is equal to "10" and the allocating time is not accomplished, the accomplishment flag is turned off and changes to "1/0". In this case, although the quantum Q3 has a remainder "30" due to the inaccomplishment, since there is not the quantum in the accomplishing state in which the accomplishment flag is equal to "1", the remainder "30" is not redistributed. Therefore, in the next T4 cycle, the same "30, 20, 20" as that in the initial allocation is reallocated. As mentioned above, after all of the accomplishment flags were turned off to "0", even if the result is not accomplished and a remainder occurs in any quantum, the distribution to the other quanta is not performed.

FIGS. 14A to 14E show another embodiment of the distributing process in case of distributing the surplus time of a certain quantum to another accomplishing quantum in step S9 in FIG. 8. In FIGS. 9A to 9C and 10A to 10C, the allocating time of each of the other quanta which have accomplished the allocating time is extended in correspondence to the surplus time. However, the embodiment is characterized in that a frequency of the quantum on the distribution destination side is increased while fixing the allocating time. FIG. 14A shows the initial set values $\tau 1$, $\tau 2$, and $\tau 3$ of the allocating times of the three quanta Q1, Q2, and Q3. At this time, as shown in FIG. 14B, when the result indicates that $\tau 1$ is accomplished in the quantum Q1, the results are shorter than the initial set values in the quanta Q2 and Q3, so that the remainder $\Delta\tau$ occurs. In this case, in the resetting in FIG. 14C, the surplus time $\Delta\tau$ that is caused due to the inaccomplishment of the quanta Q2 and Q3 is compared with the initial set allocating time $\tau 1$ of the quantum Q1. If the surplus time $\Delta\tau$ is equal to or longer than the initial set allocating time $\tau 1$, the initial set allocating time $\tau 1$ of the quantum Q1 which has accomplished the allocating time is reset there. Since the result by the resetting at the second time becomes as shown in FIG. 14D and a remainder in this case is shorter than the initial set allocating time $\tau 1$, the next setting is performed by using the initial set allocating time in FIG. 14E. Therefore, during the set allocating times of the three quanta Q1, Q2, and Q3 from time t1, the initial set allocating time $\tau 1$ is set twice with respect to the quantum Q1 which has accomplished the allocating time. Therefore, the frequency of the quantum Q1 which has accomplished the allocating time can be increased in correspondence to the remainder caused in the quanta Q2 and Q3.

FIGS. 15A to 15G show a case where the input/output of only the quantum Q1 has been performed with respect to the case of increasing the frequency of the other quanta in correspondence to the surplus time. In this case, for the initial set in FIG. 15A, the result in FIG. 15B is only the allocating time $\tau 1$ of the quantum Q1. So long as the surplus time is equal to or longer than the initial set allocating time $\tau 1$, as shown in FIGS. 15C, 15D, 15E, and 15F, the resetting of the initial set allocating time $\tau 1$ of the quantum Q1 having the result is repeated and the frequency is increased in accordance with the surplus time. When the surplus time is insufficient in FIG. 15F, the initial set allocating times $\tau 1$, $\tau 2$, and $\tau 3$ are reset at time t4 as shown in FIG. 15G and similar processes are repeated.

Figure 16:
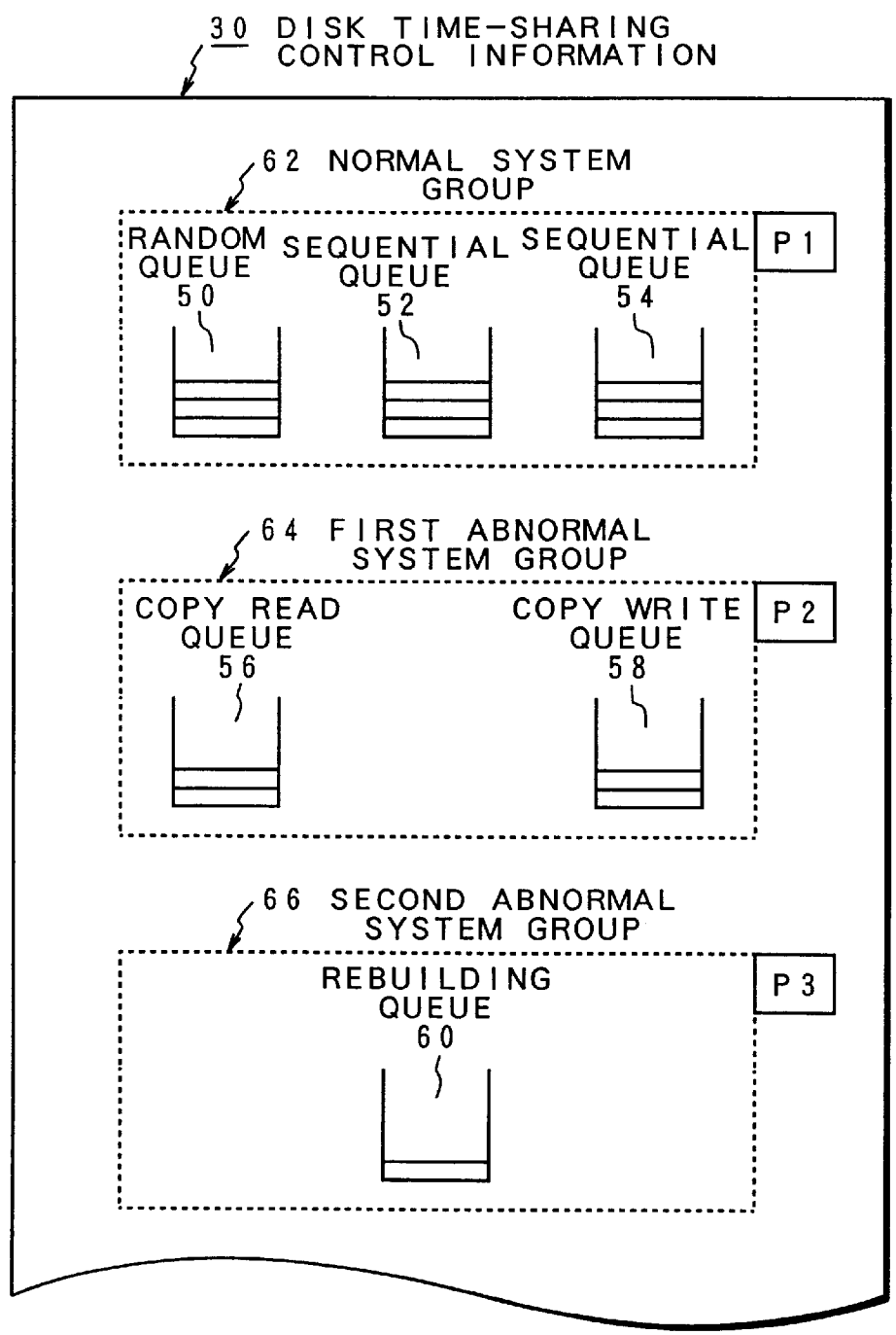
FIG. 16 is an explanatory diagram of another embodiment of the invention in the case where a plurality of input/output groups are classified into upper groups by a disk time-sharing control unit in FIGS. 2A and 2B.

FIG. 16 is an explanatory diagram of an embodiment in which the input/output groups of the disk time-sharing control mechanism provided for the disk input/output scheduling unit 20 in the embodiment of FIGS. 2A and 2B are further grouped as upper groups. In the disk time-sharing control information, in this example, a case where six groups of a random queue 50, sequential queues 52 and 54, a copy read queue 56, a copy write queue 58, and a rebuilding queue 60 are provided as input/output groups is shown as an example. For the six queues constructing those input/output groups, in the embodiment, a normal system group 62, a first abnormal system group 64, and a second abnormal system group 66 are provided as upper groups. The normal system group 62 is obtained by grouping daily input/output requests and the random queue 50 and sequential queues 52 and 54 are included there. The first abnormal system group 64 is obtained by grouping backup works and the copy read queue 56 and copy write queue 58 are included there. Further, the second abnormal system group 66 relates to a recovery process at the time of a failure as a target and the rebuilding queue 60 which is used for the input/output request of a rebuilding process at the time when a failure disk among the array disks is exchanged is included. Further, in the invention, priorities P1, P2, and P3 can be allocated to the normal system group 62, first abnormal system group 64, and second abnormal system group 66 which have been classified as upper groups, respectively. As for the priorities, P1 of the normal system group 62 is the highest, P2 of the first abnormal system group 64 is the second highest, and P3 of the second abnormal system group 66 is the lowest. By forming such upper groups, when a surplus time is caused due to the execution of the quantum of a certain input/output group, a distribution control in which the distribution destination of the surplus time is divided into the following two destinations I. it is distributed in the upper group and the distribution to the other upper groups is inhibited II. the distribution to the other upper groups is permitted can be fundamentally executed. For example, if the distribution of the surplus time to the first abnormal system group 64 and second abnormal system group 66 serving as external upper groups is inhibited with respect to the normal system group 62, when a surplus time is caused in the quantum of any one of the random queue 50 and sequential queues 52 and 54, the surplus time can be distributed to the other quanta in the group. The distribution of the surplus time to the first abnormal system group 64 or second abnormal system group 66 is inhibited. A response time of the random queue 50 in the normal system group 62 and a throughput IOPS of the sequential queues 52 and 54 can be guaranteed. With respect to the first abnormal system group 64 and second abnormal system group 66, the distribution of the surplus time to external upper groups is permitted. In this case, the distribution of the surplus time to the upper groups having the high priority is permitted and the distribution to the external upper groups having the low priority is inhibited by using the priorities P1, P2, and P3 set for the upper groups. Therefore, when a surplus time is caused in either the copy read queue 56 or copy write queue 58 of the first abnormal system group 64, the surplus time is distributed to the normal system group 62 having the high priority and the surplus time is distributed to the input/output groups which have accomplished the allocating times at present and in which the number of input/output requests is large in the group 62 by the extension of the allocating time or the increase in frequency. If a surplus time is caused in the input/output request of the rebuilding queue 60 of the second abnormal system group 66, the surplus time is first distributed to the normal system group 62 having the highest priority. If the input/output group which has accomplished the allocating time does not exist among the input/output groups of the normal system group 62, it is sufficient to distribute the surplus time to the first abnormal system group 64 having the second highest priority. By this method, the surplus time caused in the first abnormal system group 64 and second abnormal system group 66 of the low priorities is absorbed into the normal system group 62 having the highest priority. The response time of the random access and the throughput IOPS of the sequential access can be guaranteed.

Figure 17:
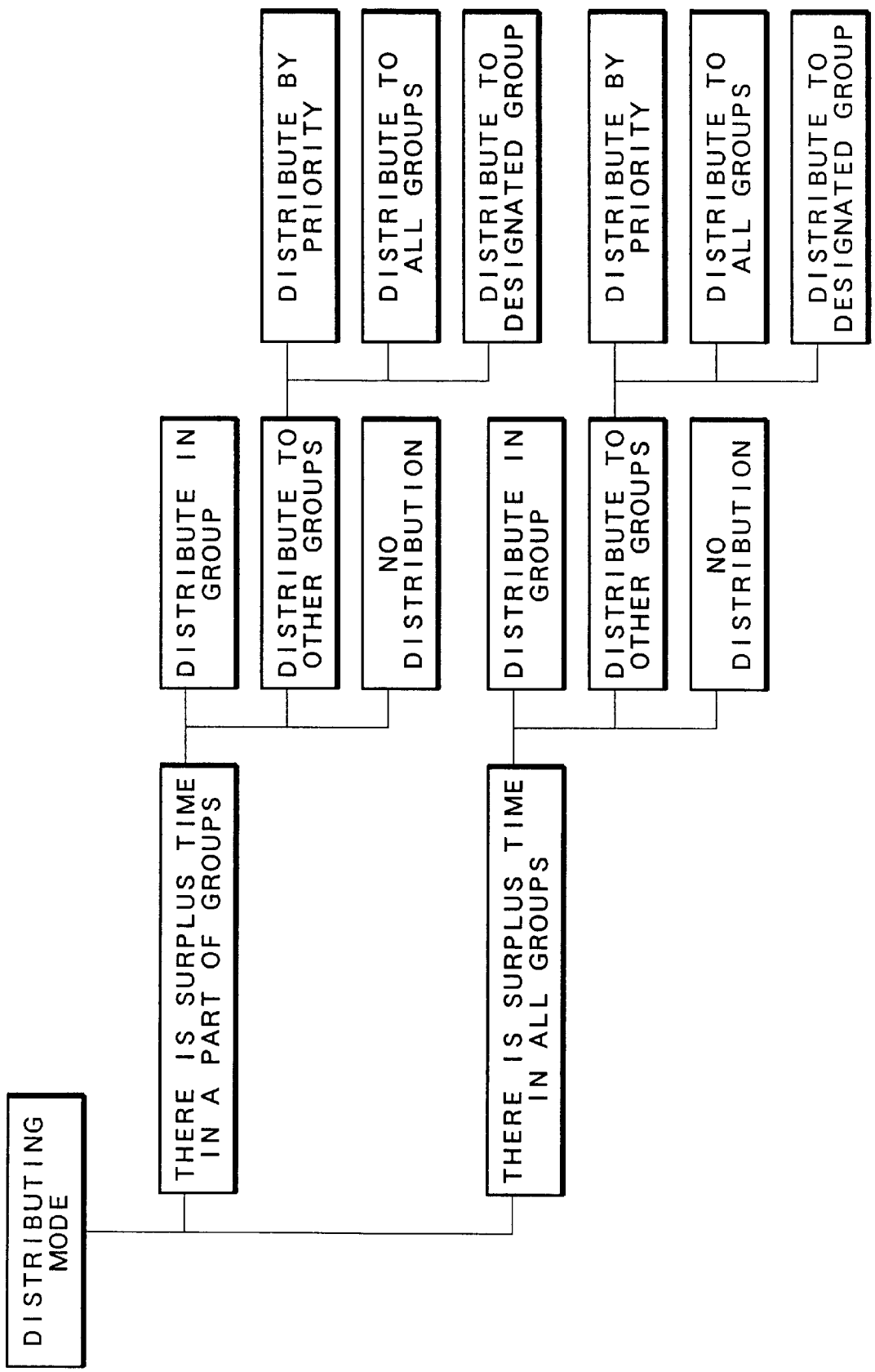
FIG. 17 is an explanatory diagram of a layer structure showing a distributing mode of the quantum surplus time in the upper groups.

FIG. 17 shows setting conditions of a distributing mode for deciding the distribution of the surplus time in the case where a plurality of input/output groups are divided into two or more upper groups by a layer structure. The highest layer in the distributing mode is classified into a case where there is a surplus in a part of the input/output groups included in the upper groups and a case where there is a surplus in all of the input/output groups. If there is a surplus in a part of the input/output groups belonging to the upper groups, any one of the following three modes can be designated: namely, the mode in which the surplus time is distributed in the group as a next layer; the mode in which it is distributed to the other group; and the mode in which it is not distributed. Among them, when the distribution to the other upper groups is designated, as shown in the further lower layer, any one of the following three cases can be designated: namely, the distribution according to the priorities; the distribution according to all groups; and the distribution to an arbitrary designated group. Similarly, also with respect to the case where there is a surplus in all of the input/output groups of a certain upper group, any one of the following three cases can be designated: namely, the distribution in the groups of the next layer; the distribution to the other groups; and no distribution. In case of distributing the surplus time to the other groups, any one of the distribution according to the priority of the next layer, the distribution according to all groups, and the distribution to an arbitrary designated group can be designated. Further, as for the distribution to the other upper groups according to the priority, in accordance with the order of the upper group having the high priority, the groups which have accomplished the allocating time among the plurality of input/output groups belonging to such an upper group are checked. If there is the group which has accomplished the allocating time, the surplus time is distributed to this group. On the contrary, in accordance with the order of the upper group of the low priority, whether the allocating time has been accomplished or not is discriminated with respect to a plurality of input/output groups included in such an upper group and the surplus time can be distributed to the input/output group which has accomplished the allocating time.

The distributing mode in the case where the surplus time is caused in the input/output groups grouped by the upper group as shown in FIG. 17 can be properly designated as necessary. The formation of the upper groups in the invention is performed to fundamentally prevent that, in the case where no upper group is formed, the surplus time is distributed to the unnecessary input/output groups and the distribution to the necessary input/output groups is not properly performed. More specifically speaking, it is intended to concentrate the surplus time on the normal system group 62 having the highest priority P1 serving as a daily work as shown in FIG. 16. For example, as for the normal system group 62, it is sufficient to inhibit the distribution to the other external groups and to designate the distribution to the upper groups according to the order of the high priority with regard to the first abnormal system group 64 and second abnormal system group 66.

Figure 18:
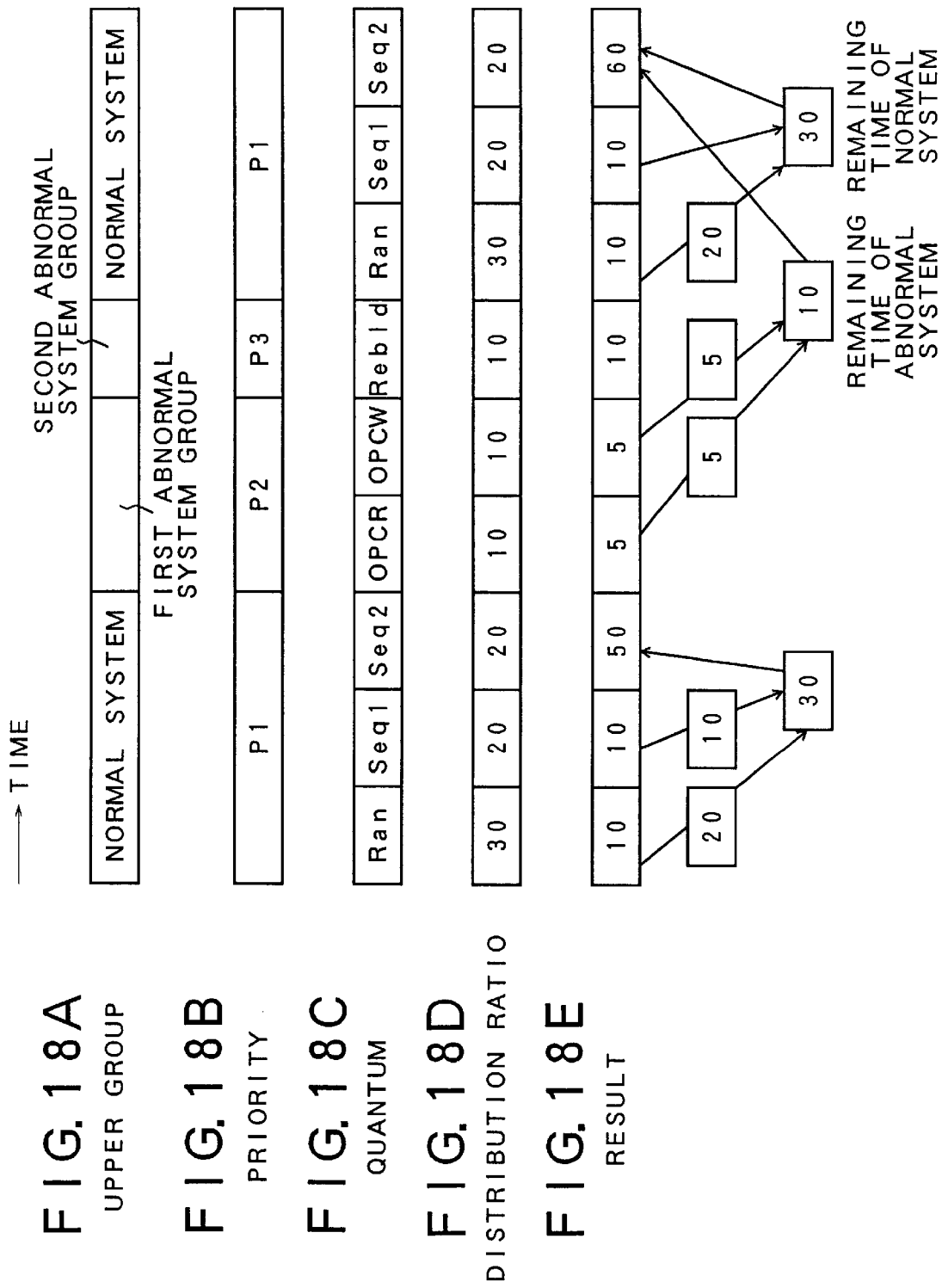
FIGS. 18A to 18E are flowcharts for an allocating time control in the case where the upper groups are divided into one normal system group and two abnormal system groups and the surplus time is distributed to the group of a higher priority.

FIGS. 18A to 18E are time charts in the case where the distribution to the groups out of the groups of the normal system group 62 is inhibited with respect to the normal system group 62, first abnormal system group 64, and second abnormal system group 66 in FIG. 16 and the distributing mode to sequentially examine the distribution destination from the group of the high priority and distribute is designated with respect to the first abnormal system group 64 and second abnormal system group 66. FIG. 18A shows the quantum switching of the upper groups and the systems are repeated in order of the normal system, first abnormal system, and second abnormal system. As shown in FIG. 18B, the priorities in this case are set to the highest priority P1 for the normal system, the second highest priority P2 for the first abnormal system, and the lowest priority P3 for the second abnormal system. In the actual input/output groups, as shown in the quantum of FIG. 18C, a random access, a sequential 1, a sequential 2, a copy read access OPCR, a copy write access OPCW, and a rebuilding Rebld are repeated. Distribution ratios as initial setting in this case are set to "30, 20, 20" for the normal system, "10, 10" for the first abnormal system, and "10" for the second abnormal system. On the other hand, the redistribution of the results and surplus time as shown in FIG. 18E is performed. First, in the first normal system, assuming that the results of the random access RAN and sequential Seq1 are equal to "10, 10" and the allocating time is not accomplished and a surplus time "20, 10" occurs, respectively, and the result of the sequential Seq2 is equal to "30", the total values of the surplus components are equal to "30" and "50", respectively. In the next first abnormal system, the initial allocations of both copy read access OPCR and copy write access OPCW are equal to "10, 10" and, since the results are equal to "5, 5" in this case, the surplus component of the whole group is equal to "10". In the rebuilding access Rebld of the second abnormal system, since the initial allocation is equal to "10" and the result is equal to "10", there is no surplus. In the next switching time of the normal system, the result of the random access RAN is equal to "30", the result of the next sequential access Seq1 is equal to "10", and the surplus times "20, 10" are caused, respectively. Further, since the surplus time "10" exists in the first abnormal system whose processes have already been finished, the total surplus time "60" obtained by adding them is allocated to the sequential access Seq2.

Figure 19:
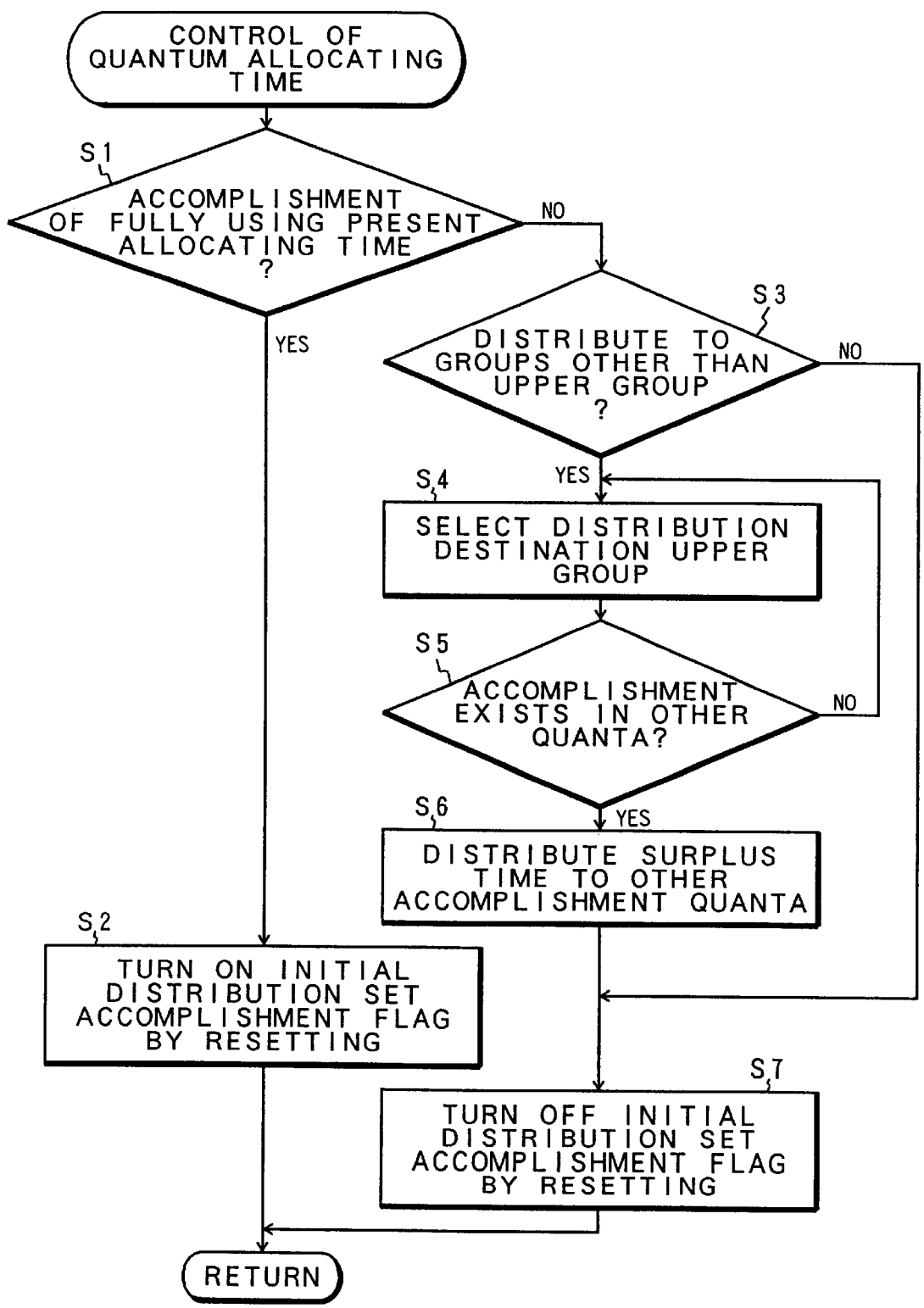
FIG. 19 is a flowchart for an allocating time control according to the invention in which the input/output groups are classified into the upper groups.

FIG. 19 is a flowchart for a quantum allocating time control in the case where a plurality of input/output groups shown in FIG. 16 are divided into two or more upper groups. In a manner similar to the flowchart of FIG. 8, the above control is executed as a subroutine of the allocating time control of the quantum in step S13 in FIG. 7B. First, in step S1, whether an accomplishment in which the present allocating time has fully been used has been made or not is discriminated. If the allocating time has been accomplished, step S2 follows, an initial distribution is set by resetting the present quantum, and the accomplishment flag is turned on. If the allocating time is not accomplished in step S1, step S3 follows and whether the surplus time is distributed to the groups out of the upper groups or not is discriminated. If the distribution to the groups out of the upper groups has been set with respect to the present quantum, step S4 follows and a process for selecting the upper group of the distribution destination is executed. In the selecting process of the upper group of the distribution destination, for example, the upper groups are checked in order from the group of the high priority. A check is made in step S5 to see if the quantum which has accomplished the allocating time exists in the input/output group belonging to the upper group selected as a distribution destination. If there is the quantum which has accomplished the allocating time, step S6 follows. The surplus time of the present quantum is distributed to the accomplishment quantum. In step S7, the initial distribution setting is performed by resetting the present quantum. After that, since the present quantum does not accomplish the allocating time, the accomplishment flag is turned off.

Figure 20:
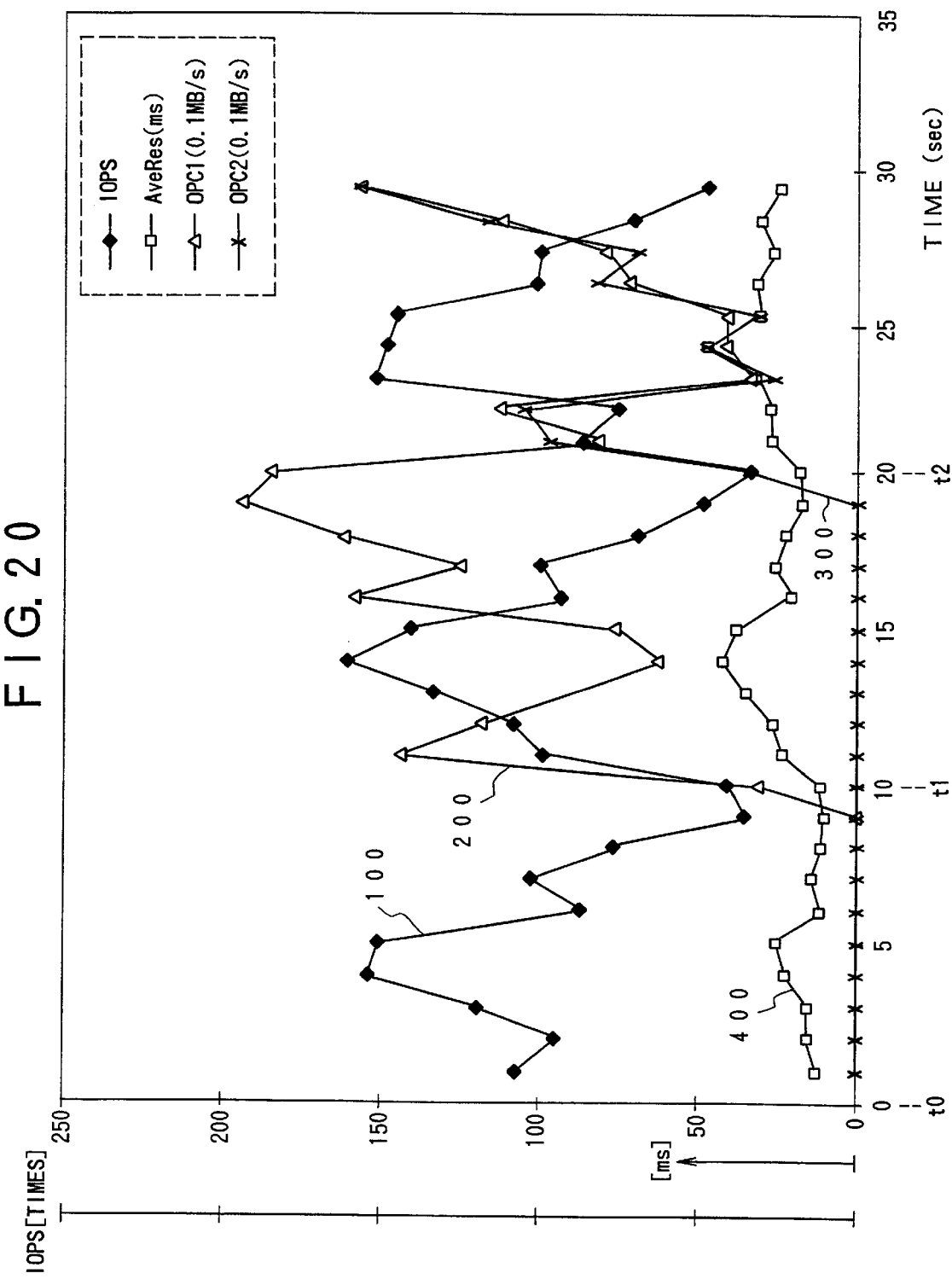
FIG. 20 is an explanatory diagram of measurement results of a throughput IOPS and a response time in the case where a random access, a sequential access, and two coping accesses are respectively grouped as input/output groups and the allocating time control of the invention is executed.

FIG. 20 is a time chart for the throughput IOPS (times) and the response time (msec) in the case where the input/output groups are divided into four groups of the random access group, sequential access group, and further, two copy access groups, the ratios of the allocating time are set to 140 msec, 40 msec, 10 msec, and 10 msec, and a simulation is performed. In the diagram, an axis of abscissa denotes the time, the random access is continuously performed, the number of input/output requests is changed to 100 IOPS, 160 IOPS, 40 IOPS, and 100 IOPS at intervals of 2.5 seconds in order to give a time-dependent change of the random access, and the above operation is repeated every 10 seconds. It is assumed that there is no input/output request in the sequential access. Further, the first copy access starts to flow from time t1 that is 10 seconds after the start of the simulation. The second copy access starts to flow at time t3 that is 20 seconds after the start of the simulation. Further, in this simulation, as shown in FIG. 2, the disk apparatus 16 constructs a mirror disk of RAID1 by two disk drives. In the simulation results, a throughput of the random access becomes as shown by characteristics 100, a throughput of the first copy access becomes as shown by characteristics 200, and further, a throughput of the second copy access becomes as shown by characteristics 300. Further, the response time for the random access request characteristics 100 becomes as shown by characteristics 400. From such simulation results, the throughput characteristics 100 of the random access rise in 5 to 6 seconds after the start during a time interval of 10 seconds and are equal to about 160 IOPS. An average response time at this time becomes slightly long and is extended to about 25 msec when the throughput IOPS as the number of requests of the random access is high as shown by the characteristics 400. The two copy accesses flow as shown by the characteristics 200 and 300 after time t1 that is 20 seconds after the start. Although the two copy accesses continuously flow because there are a number of input/output requests, each allocating time ratio is limited to 5% of the whole time. If the number of input/output requests of the random access of the characteristics 100 decreases (the load is lightened), however, the surplus time of the random access is distributed to two copy accesses and each throughput IOPS rises as shown by the characteristics 200 and 300. Therefore, the throughput characteristics 100 of the random access and the throughput characteristics 200 and 300 of the copy access have the opposite waveforms.

Another embodiment of the invention will now be described. According to this embodiment, a definition table for defining whether the time-sharing is performed or not is provided for the disk input/output scheduling unit 20 in FIGS. 2A and 2B for each of the group queues 40-1, 40-2, and 40-3. Those definition tables are constructed, for example, as follows.

| Group queue 38-1 | flag |
| Group queue 38-2 | flag |
| Group queue 38-3 | flag |

The RAID control unit 26 has an interface which refers to the definition tables. When the input/output request is received from the input/output request unit 18, if a valid flag of the time-sharing is recognized with reference to the definition tables, the RAID control unit 26 issues the input/output request to the input/output request receiving unit 34, stores it into the corresponding group queue, and performs the time-sharing. On the other hand, when an invalid flag of the time-sharing is recognized from the definition tables in response to the input/output request, the RAID control unit 26 directly issues the input/output request to the disk apparatus 16. At this time, when a plurality of input/output requests serving as targets of the invalid flag continue in the RAID control unit 26, the input/output requests serving as targets of the invalid flag are directly processed for the disk apparatus 16, and after that, a predetermined idle time, for example, an idle time of about hundreds of milliseconds is provided, and the direct process of the next input/output request to the disk apparatus 16 is executed. For this idle time, the disk access according to the quantum time of the input/output requests which have already been stored in the group queues 40-1 to 40-3 is executed. Thus, whether the time-sharing due to the allocation of the quantum time is performed as necessary with respect to the input/output group or not can be freely set.

In another embodiment of the invention, when an error occurs by the access of the disk apparatus 16 by the time-sharing according to the quantum time, the error ended input/output request is again stored in the group queue and the input/output request is retried. As a method of queueing the input/output request in association with the error end, any one of the following three methods is used.

I. stores at the head of the group queue

II. stores at the end of the group queue

III. directly accesses to the disk apparatus

As further another embodiment of the invention, in the case where the disk drive 24-2 is constructed as a mirror disk drive for the disk drive 24-1 and the disk time-sharing control information 30-1 and 30-2 is provided for each of the disk drives 24-1 and 24-2, if an access cannot be performed due to a hard error or the like of the disk drive 24-1, all of the processes are set into the mirror disk drive 24-2 and the processes are continued. In this instance, as for the unprocessing input/output requests remaining in the group queues 38-1 to 38-3 of the disk time-sharing control information 30-1 whose processes have been stopped, all of them are notified as an abnormal end to the input/output request unit 18 via the RAID control unit 26 and are processed by the retry by the input/output request unit 18. Thus, there is no need to transfer the unprocessing input/output requests to the mirror disk side and they can be efficiently processed.

As described above, according to the time-sharing apparatus and method of the invention, in the case where the quantum serving as an allocating time which occupies the disk apparatus is allocated by dividing the input/output groups into a plurality of input/output groups such as random access, sequential access, copy access, and the like, if the number of input/output groups decreases in a specific input/output group and a surplus time is caused in the quantum, the surplus time is dynamically distributed to the other input/output groups in which the number of input/output requests is large. Therefore, it is possible to access efficiently without causing an idle time in the disk apparatus. Particularly, the response time can be guaranteed with respect to the random access and the throughput IOPS can be guaranteed with regard to the sequential access.

In the invention, by further grouping a plurality of input/output groups into two or more upper groups, for example, the surplus time of the other upper groups can be concentratedly distributed to the specific upper group. If the random access and sequential access which are performed as daily works are included in the upper group of the distribution destination, even if a surplus time is caused in those input/output groups having high necessity, the surplus time is not distributed to the other unusual input/output groups. Contrarily, the surplus time occurring in the unusual input/output groups can be concentratedly distributed to the daily random access and sequential access. The response time of the random access and the throughput IOPS of the sequential access can be certainly guaranteed.

Although the above embodiment has been mentioned with respect to the random access, sequential access, copy access, and rebuilding process of RAID as input/output groups as an example, it is possible to use any other proper method of grouping the inputs/outputs such as a method of grouping them every logic volume of the same performance requirement or the like as necessary.

In the above embodiment, as a request for the input/output request in case of making the most of the ordered function of the disk drive, the case of selectively using the simple task and the ordered task has been described as an example. However, the invention is not limited to it but can be applied to a disk drive which does not have the ordered function.

Further, although the embodiment has been described with respect to the case where the input/output request unit 18 and disk input/output scheduling unit 20 have been provided for the array disk apparatus 14 as shown in FIG. 1 as an example, it will be obviously understood that the input/output request unit 18 can be provided on the server side and, further, the input/output request unit 18 and disk input/output scheduling unit 20 can be also provided on the server side.

Further, the invention incorporates many proper modifications without obstructing the objects and advantages of the present invention and is not limited by the numerical values shown in the embodiments.

What is claimed is:

1. A disk time-sharing apparatus comprising:

a disk apparatus having one or a plurality of disk drives;

an input/output request unit for issuing an input/output request to said disk apparatus;

an input/output scheduling unit for forming input/output groups obtained by grouping inputs/outputs to/from said disk apparatus in accordance with their kinds, defining an allocating time (quantum) during which each of said input/output groups can continuously use the disk apparatus, and in the case where requests for input/output are received from a plurality of input/output groups to the disk apparatus, sequentially switching said allocating time among the input/output groups which competed, and using the disk apparatus; and an allocating time control unit for fluctuating said allocating time in accordance with a degree of jam of the input/output processing requests of said input/output groups.

2. An apparatus according to claim 1, wherein said allocating time control unit distributes a surplus allocating time of the input/output groups in which the number of processing requests is small by extending an allocating time of the input/output groups in which the number of processing requests is large.

3. An apparatus according to claim 1, wherein said allocating time control unit distributes a surplus allocating time of the input/output groups in which the number of processing requests is small by increasing a frequency of the allocating time without changing an allocating time of the input/output groups in which the number of processing requests is large.

4. An apparatus according to claim 1, wherein said input/output scheduling unit forms two or more upper groups by grouping said plurality of input/output groups, and said allocating time control unit performs a distribution of a surplus time between the respective input/output groups only in said upper groups.

5. An apparatus according to claim 4, wherein said allocating time control unit performs the distribution of the surplus time between said upper groups.

6. An apparatus according to claim 5, wherein in the case where there is a surplus time in all of the input/output groups belonging to a certain upper group, said allocating time control unit distributes the surplus time to the input/output groups in which the number of processing requests is large in the other upper groups.

7. An apparatus according to claim 6, wherein in the case where the input/output group which can fully use the surplus time does not exist in the upper group of a distribution destination, the allocating time control unit does not distribute the surplus time to the other upper groups.

8. An apparatus according to claim 6, wherein the input/output scheduling unit sets priorities to said upper groups, and the allocating time control unit checks degrees of jam of the input/output requests in order from the upper group of the high priority and distributing the surplus time of the other upper groups to the upper groups in which the number of input/output processing requests is large.

9. An apparatus according to claim 6, wherein the input/output scheduling unit sets priorities to said upper groups, and the allocating time control unit checks degrees of jam of the input/output requests in order from the upper group of the low priority and distributing the surplus time of the other upper groups to the upper groups in which the number of input/output processing requests is large.

10. An apparatus according to claim 6, wherein the allocating time control unit distributes the surplus time of the other upper groups to a previously designated upper group.

11. An apparatus according to claim 5, wherein in the case where there is a surplus time in a part of the input/output groups belonging to a certain upper group, said allocating time control unit distributes the surplus time to the input/output groups in which the number of processing requests is large in the other upper groups.

12. An apparatus according to claim 11, wherein in the case where the input/output group which can fully use the surplus time does not exist in the upper group of a distribution destination, the allocating time control unit does not distribute the surplus time to the other upper groups.

13. An apparatus according to claim 11, wherein the input/output scheduling unit sets priorities to said upper groups, and the allocating time control unit checks degrees of jam of the input/output requests in order from the upper group of the high priority and distributing the surplus time of the other upper groups to the upper groups in which the number of input/output processing requests is large.

14. An apparatus according to claim 11, wherein the input/output scheduling unit sets priorities to said upper groups, and the allocating time control unit checks degrees of jam of the input/output requests in order from the upper group of the low priority and distributing the surplus time of the other upper groups to the upper groups in which the number of input/output processing requests is large.

15. An apparatus according to claim 11, wherein the allocating time control unit distributes the surplus time of the other upper groups to a previously designated upper group.

16. An apparatus according to claim 5, wherein said allocating time control unit distributes a remaining allocating time of the input/output groups which belong to a certain upper group and in which the number of input/output processing requests is small by extending an allocating time of the input/output groups which belong to the other upper groups and in which the number of input/output processing requests is large.

17. An apparatus according to claim 5, wherein said allocating time control unit distributes a remaining allocating time of the input/output groups which belong to a certain upper group and in which the number of input/output processing requests is small by increasing a frequency of the allocating time without changing an allocating time of the input/output groups which belong to the other upper groups and in which the number of input/output processing requests is large.

18. A disk time-sharing method for a disk time-sharing apparatus comprising a disk apparatus having one or a plurality of disk drives, an input/output request unit for issuing an input/output request to said disk apparatus, and an input/output scheduling unit for scheduling the use of said disk apparatus in accordance with said input/output request, said method comprising:

forming input/output groups obtained by grouping inputs/outputs to/from said disk apparatus in accordance with their kinds and defining an allocating time (quantum) during which each of said input/output groups can continuously use the disk apparatus;

in the case where requests for input/output are received from a plurality of input/output groups to said disk apparatus, sequentially switching said allocating time among the input/output groups which competed and using the disk apparatus; and fluctuating said allocating time in accordance with a degree of jam of the input/output processing requests of said input/output groups.

19. A method according to claim 18, wherein a surplus allocating time of the input/output groups in which the number of processing requests is small is distributed by extending an allocating time of the input/output groups in which the number of processing requests is large.

20. A method according to claim 18, wherein a surplus allocating time of the input/output groups in which the number of processing requests is small is distributed by increasing a frequency without changing an allocating time of the input/output groups in which the number of processing requests is large.

21. A method according to claim 18, further comprising:

forming two or more upper groups by grouping said plurality of input/output groups; and distributing a surplus time between said input/output groups only in the upper group.

22. A method according to claim 21, wherein the distribution of the surplus time is performed between said upper groups.

23. A method according to claim 22, wherein in the case where there is a surplus time in all of the input/output groups belonging to a certain upper group, the surplus time is distributed to the input/output groups in which the number of processing requests is large in the other upper groups.

24. A method according to claim 23, wherein in the case where the input/output group which can fully use the surplus time does not exist in the upper group of a distribution destination, the surplus time is not distributed to the other upper groups.

25. A method according to claim 24, wherein the surplus time of the other upper groups is distributed to a previously designated upper group.

26. A method according to claim 23, wherein priorities are set into said upper groups, degrees of jam of the input/output requests are checked in order from the upper group of the high priority, and the surplus time of the other upper groups is distributed to the upper groups in which the number of input/output processing requests is large.

27. A method according to claim 23, wherein priorities are set into said upper groups, degrees of jam of the input/output requests are checked in order from the upper group of the low priority, and the surplus time of the other upper groups is distributed to the upper groups in which the number of input/output processing requests is large.

28. A method according to claim 22, wherein in the case where there is a surplus time in a part of the input/output groups belonging to a certain upper group, the surplus time is distributed to the input/output groups in which the number of processing requests is large in the other upper groups.

29. A method according to claim 28, wherein the surplus time of the other upper groups is distributed to a previously designated upper group.

30. A method according to claim 28, wherein in the case where the input/output group which can fully use the surplus time does not exist in the upper group of a distribution destination, the surplus time is not distributed to the other upper groups.

31. A method according to claim 28, wherein priorities are set into said upper groups, degrees of jam of the input/output requests are checked in order from the upper group of the high priority, and the surplus time of the other upper groups is distributed to the upper groups in which the number of input/output processing requests is large.

32. A method according to claim 28, wherein priorities are set into said upper groups, degrees of jam of the input/output requests are checked in order from the upper group of the low priority, and the surplus time of the other upper groups is distributed to the upper groups in which the number of input/output processing requests is large.

33. A method according to claim 22, wherein a remaining allocating time of the input/output groups which belong to a certain upper group and in which the number of input/output processing requests is small is distributed by extending an allocating time of the input/output groups which belong to the other upper groups and in which the number of input/output processing requests is large.

34. A method according to claim 22, wherein a remaining allocating time of the input/output groups which belong to a certain upper group and in which the number of input/output processing requests is small is distributed by increasing a frequency of the allocating time without changing an allocating time of the input/output groups which belong to the other upper groups and in which the number of input/output processing requests is large.

35. A disk time-sharing apparatus comprising:

a disk apparatus having one or a plurality of disk drives;

an input/output request unit for issuing an input/output request to said disk apparatus; and an input/output scheduling unit for forming input/output groups obtained by grouping inputs/outputs to/from said disk apparatus in accordance with their kinds, defining an allocating time (quantum) during which each of said input/output groups can continuously use the disk apparatus, and in the case where requests for input/output are received from a plurality of input/output groups to the disk apparatus, sequentially switching said allocating time among the input/output groups which competed, and using the disk apparatus, wherein said input/output scheduling unit provides group queues in correspondence to said input/output groups, provides a definition table for setting a valid flag or an invalid flag of time-sharing for each of said group queues, issues the input/output request to said input/output scheduling unit in the case where said valid flag is recognized with reference to said definition tables on an input/output request unit side, and directly issues an input/output request to said disk apparatus in the case where said invalid flag is recognized.

36. An apparatus according to claim 35, wherein in the case where the input/output requests in which said invalid flag is recognized with reference to said definition tables continue, said input/output request unit directly issues the input/output request to said disk apparatus and, after that, directly issues the next input/output request to said disk apparatus after an elapse of a predetermined idle time.

37. A disk time-sharing apparatus comprising:

a disk apparatus having one or a plurality of disk drives;

an input/output request unit for issuing an input/output request to said disk apparatus; and an input/output scheduling unit for forming input/output groups obtained by grouping inputs/outputs to/from said disk apparatus in accordance with their kinds, defining an allocating time (quantum) during which each of said input/output groups can continuously use the disk apparatus, and in the case where requests for input/output are received from a plurality of input/output groups to the disk apparatus, sequentially switching said allocating time among the input/output groups which competed, and using the disk apparatus, wherein said input/output scheduling unit has group queues corresponding to said input/output groups, and after the input/output requests were taken out from said group queues and issued to said disk apparatus, if an error end is received, said input/output scheduling unit again stores the error ended input/output requests into the group queues and processes them.

38. An apparatus according to claim 37, wherein said input/output scheduling unit again stores the error ended input/output request to the head or end of said group queue or directly issues the input/output request to said disk apparatus.

* * * * *